United States Patent
Hu et al.

(10) Patent No.: US 11,968,020 B2
(45) Date of Patent: Apr. 23, 2024

(54) SCALABLE HERMITIAN MATRIX INVERSION

(71) Applicant: QUALCOMM Incorporated, San Diego, CA (US)

(72) Inventors: Wenquan Hu, Espoo (FI); Andrea Garavaglia, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/934,564

(22) Filed: Sep. 22, 2022

(65) Prior Publication Data

US 2024/0106517 A1   Mar. 28, 2024

(51) Int. Cl.
*H04B 7/08* (2006.01)
(52) U.S. Cl.
CPC .................. *H04B 7/0854* (2013.01)
(58) Field of Classification Search
CPC ...... H04B 17/309; H04L 43/50; H04W 24/08; H04W 24/10
See application file for complete search history.

(56) References Cited

FOREIGN PATENT DOCUMENTS

JP        2013232930 A  * 11/2013  ......... H04B 1/71052

OTHER PUBLICATIONS

JP-2013232930-A English translation (Year: 2013).*

* cited by examiner

*Primary Examiner* — Nader Bolourchi
(74) *Attorney, Agent, or Firm* — QUALCOMM Incorporated

(57) ABSTRACT

An apparatus may be configured to obtain one or more of data or at least one signal associated with at least one first matrix, where the at least one first matrix is at least one square matrix; perform a decomposition process on the at least one first matrix to obtain at least one first triangular matrix; estimate an inverse of the at least one first triangular matrix based on the at least one second triangular matrix; calculate an inverse of the at least one first matrix based on at least one of (1) the estimated inverse of the at least one second triangular matrix, or (2) the estimated inverse of the at least one first triangular matrix; and transmit one or more of the data or the at least one signal based on the calculated inverse of the at least one first matrix.

30 Claims, 10 Drawing Sheets

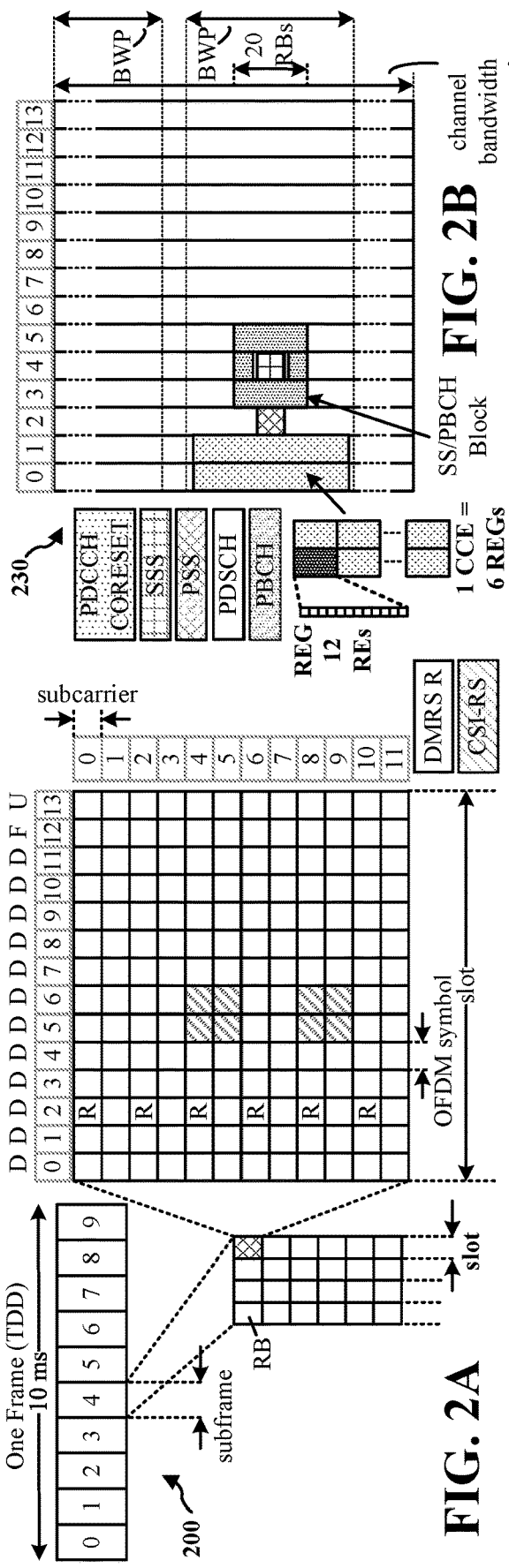
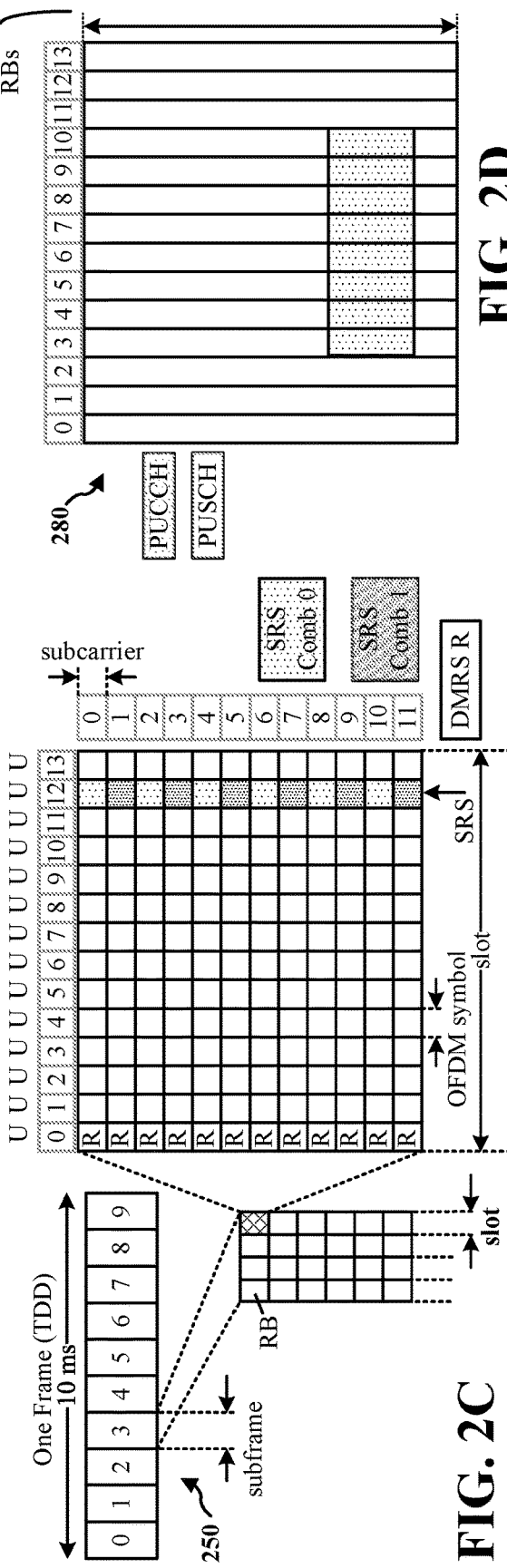
FIG. 2A
FIG. 2B
FIG. 2C
FIG. 2D

SCALABLE HERMITIAN MATRIX INVERSION

TECHNICAL FIELD

The present disclosure relates generally to communication systems, and more particularly, to a physical layer signal processing associated with matrix processing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to obtain one or more of data or at least one signal associated with at least one first matrix, where the at least one first matrix is at least one square matrix, such that a length of the at least one first matrix is equal to a width of the at least one first matrix. The apparatus may be configured to perform a decomposition process on the at least one first matrix to obtain at least one first triangular matrix. The apparatus may also be configured to normalize, based on the decomposition process, the at least one first triangular matrix to obtain at least one second triangular matrix. The apparatus may be configured to estimate at least one of: (1) an inverse of the at least one second triangular matrix, or (2) an inverse of the at least one first triangular matrix based on the at least one second triangular matrix. The apparatus may further be configured to calculate an inverse of the at least one first matrix based on at least one of: (1) the estimated inverse of the at least one second triangular matrix, or (2) the estimated inverse of the at least one first triangular matrix. The apparatus may be configured to transmit one or more of the data or the at least one signal based on the calculated inverse of the at least one first matrix.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
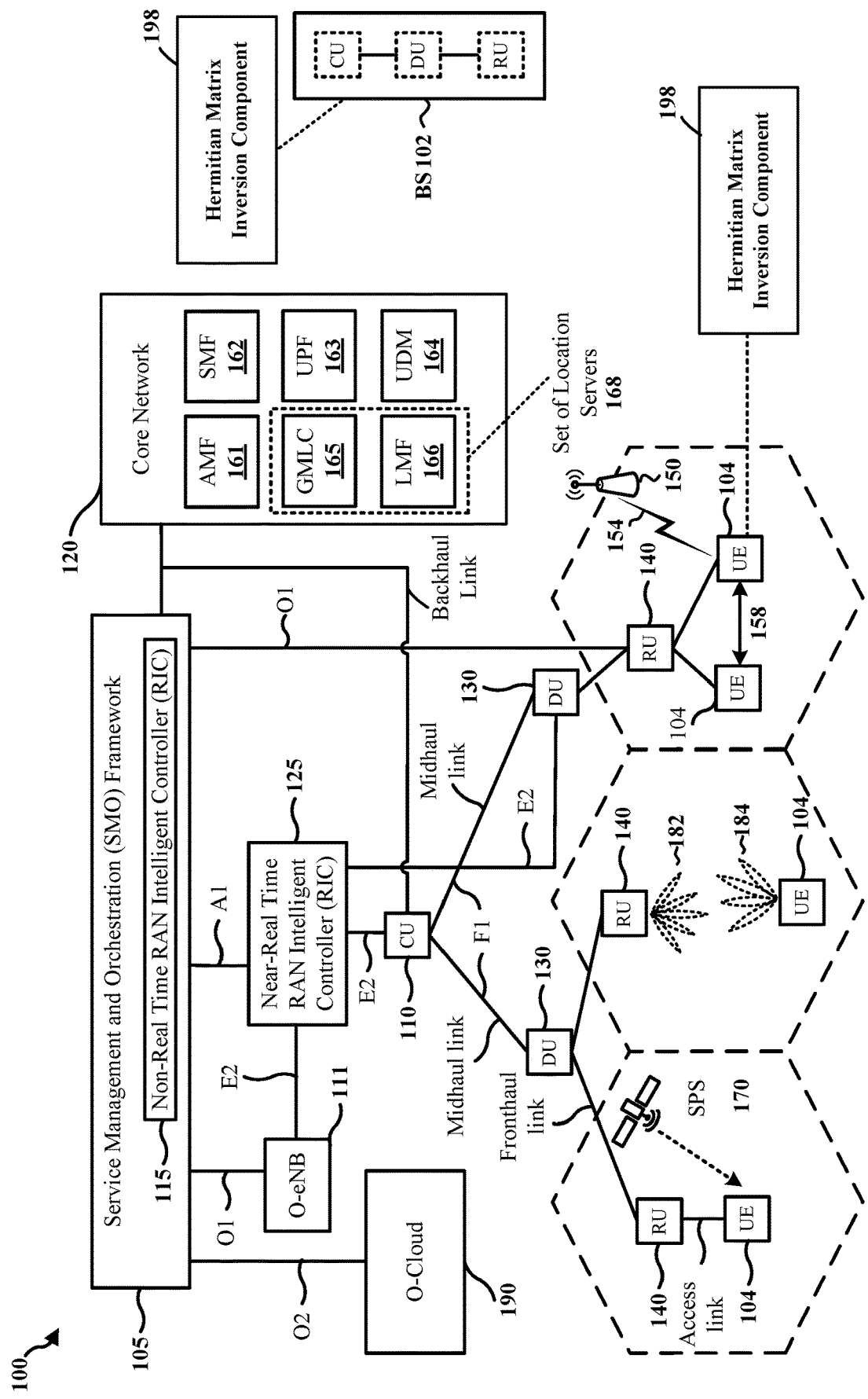
FIG. 1 is a diagram illustrating an example of a wireless communications system and an access network.

Matrix inversion is commonly used in physical layer signal processing. One example is that for a minimum mean square error (MMSE) and interference rejection combiner (IRC) (MMSE-IRC) receiver, an equalizer output (e.g., a received signal Y based on a transmitted signal X with a channel response H) may be written as Y=HX+Z. An estimation of the original signal X, may be given by $\hat{X}=H^H$ $(HH^H+R_{zz})^{-1}Y$, where $R_{zz}=E(ZZ^H)$. To calculate the middle term of the equalization which is a matrix inversion (e.g., $(HH^H+R_{zz})^{-1}$) may consume a large amount of resources in a firmware implementation (e.g., a large amount of computations and/or processor cycles) when the matrix size is large, e.g., 16×16, 24×24, or even higher. A method and apparatus are presented that may be used to reduce the resources consumed in computing and/or calculating the matrix inversion for recovering the transmitted signal. While discussed below in relation to wireless communication, the method and apparatus provided in this disclosure may be applied in additional use cases in which a system computes the inverse of a Hermitian matrix as described below.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs.

Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may include a Hermitian matrix inversion (HMI) component 198 configured to obtain one or more of data or at least one signal associated with at least one first matrix, where the at least one first matrix is at least one square matrix, such that a length of the at least one first matrix is equal to a width of the at least one first matrix. The HMI component 198 may be configured to perform a decomposition process on the at least one first matrix to obtain at least one first triangular matrix. The HMI component 198 may also be configured to normalize, based on the decomposition process, the at least one first triangular matrix to obtain at least one second triangular matrix. The HMI component 198 may be configured to estimate at least one of: (1) an inverse of the at least one second triangular matrix, or (2) an inverse of the at least one first triangular matrix based on the at least one second triangular matrix. The HMI component 198 may further be configured to calculate an inverse of the at least one first matrix based on at least one of: (1) the estimated inverse of the at least one second triangular matrix, or (2) the estimated inverse of the at least one first triangular matrix. The HMI component 198 may further be configured to transmit one or more of the data or the at least one signal based on the calculated inverse of the at least one first matrix. Although the following description may be focused on wireless communication, the concepts described herein may be applicable to other similar areas, such as signal processing in general FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu$*kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
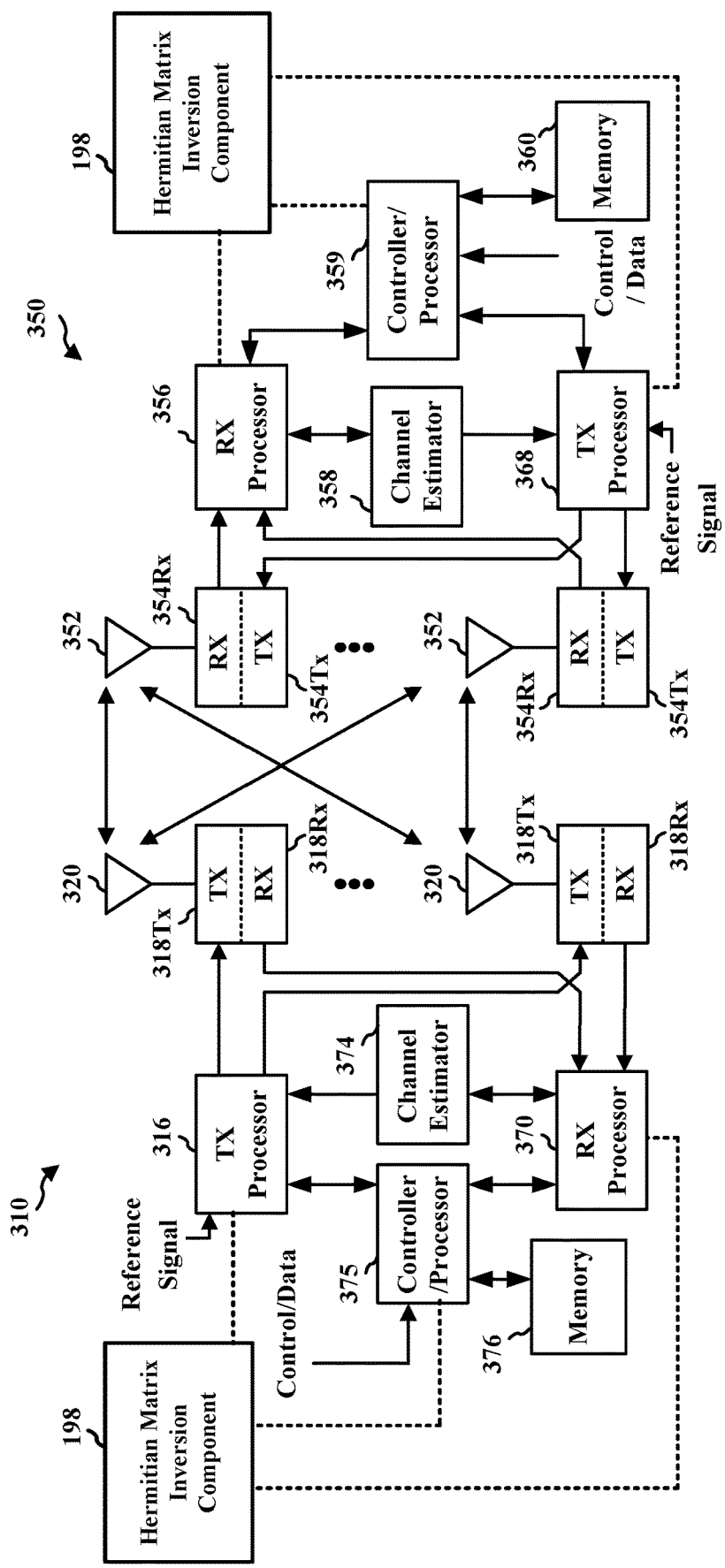
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the HMI component 198 of FIG. 1.

At least one of the TX processor 316, the RX processor 370, and the controller/processor 375 may be configured to perform aspects in connection with the HMI component 198 of FIG. 1.

In some aspects of wireless communication, matrix inversion may be used in physical layer signal processing. One example is that for a MMSE-IRC receiver, an equalizer output (e.g., a received signal Y based on a transmitted signal X with a channel response H) may be written as Y=HX+Z. An estimation of the original signal X, may be given by $\hat{X}=H^H(HH^H+R_{zz})^{-1}$ Y, where $R_{zz}=E(ZZ^H)$ represents an auto-correlation of Z. Calculating the middle term of the equalization which is a matrix inversion (e.g., $(HH^H+R_{zz})^{-1}$) may consume a large amount of resources in a firmware implementation (e.g., a large amount of computations and/or processor cycles) when the matrix size is large, e.g., 16×16, 24×24, or even higher. Accordingly, for a received signal, a receiving device attempting to recover (or estimate) the original signal X may perform a series of operations including calculating an inverse of the matrix $(HH^H+R_{zz})$. Calculating the inverse of the matrix in a processor of the receiving device may involve a large number of calculations that consume a large amount of power and/or may introduce latency while waiting for the calculations to complete. By configuring the processor to calculate (or estimate) a matrix inverse using fewer calculations and/or computations (e.g., using fewer processor cycles) the processing of the received signal may be performed while consuming less power and/or reducing a latency associated with additional processor cycles. Accordingly, a method and apparatus are presented that may be used to reduce the resources consumed in computing and/or calculating the matrix inversion for recovering the transmitted signal. While discussed below in relation to wireless communication, the method and apparatus provided in this disclosure may be applied in additional use cases in which a system computes the inverse of a Hermitian matrix.

For example, in some aspects of UL Rx beamforming (e.g., for a large-scale MIMO application at a base station receiving transmissions from M users associated with K antennas, where M<K), the inverse of noise covariance may be calculates as, $$\tilde{R}^{-1} = \frac{N}{\mu tr(R)}\left(I_N + \frac{1}{\beta}ZZ^H\right)^{-1} = \frac{N}{\mu tr(R)}(I_N - Z(\beta I_P + Z^H Z)^{-1} Z^H),$$

where $$\mu = 0.01 \sim 0.5, R = \frac{1}{P}\sum_{p=1}^{P} z_p z_p^H,$$

$$\beta = \frac{\mu P tr(R)}{(1-\mu)N}, \text{ and } Z = [z_1 | z_2 | \ldots | z_P] \in C^{N \times P}$$

are the residuals of the received signal subtracting the reconstructed received RSs. The core of solving for $\tilde{R}^{-1}$ may be to calculate the matrix inverse term in the above equation (e.g., $(\beta I_P + Z^H Z)^{-1}$) which is computation intensive. In this additional example, the use of the method for processing and/or obtaining a received signal that may be a combination of signals transmitted from multiple transmitting devices may provide the power consumption and latency reduction for signal processing. The calculated matrix inverse term may be used to adjust a directivity pattern of the antennas of a base station in such a way as to create a peak gain to the direction of one or more transmitting UEs. The calculated matrix inverse term, in some aspects, may be used to configure a pre-coding matrix and/or beamforming matrix associated with the adjusted directivity pattern for one or more antennas for the UL Rx beamforming. In some aspects, a pre-coding matrix may be referred to as a beamforming matrix, or vice versa, such that the term "pre-coding matrix" may be used interchangeably with the term "beamforming matrix." As discussed above, by reducing the computation and/or time resources used to calculate (or estimate) the matrix inversion for the signal processing, the overall power consumption and/or latency associated with the signal processing may be reduced while simultaneously reducing the interference between different devices (e.g., UEs).

In some aspects, the method and/or apparatus described herein may be used for beamforming for signal transmission. For example, in zero-forcing (or null-steering) precoding for a beamforming operation (e.g., DL beamforming performed by a base station communicating with multiple wireless devices) may also benefit from the disclosed method and/or apparatus. In some aspects, zero-forcing precoding may be used by a multi-antenna transmitted to minimize (or null) a multi-user interface in a multi-user MIMO wireless communication. For example, in a multiple-antenna DL system with $N_t$ transmit antenna access points and K single receive antenna users such that $K<N_t$, the received signal of a user k may be given as $y_k = h_k^T x + n^k$, for k=1, 2, ..., K. The K×1 received signal vector y made up of the signals $y_k$, in some aspects, may be rewritten as $y = H^T W_{zf} S + n$ where $H = [h_1, \ldots, h_K]$ is the $N_t \times K$ channel matrix, $W_{zf} = [w_1, \ldots w_K]$ is the $N_t \times K$ precoding matrix, and $S = diag(\sqrt{P_1}, \ldots, \sqrt{P_K}) \times [s_1, \ldots, s_K]^T$ is a K×1 transmit signal matrix with components $s_i \sqrt{P_i}$ for i=1, ... K (where $s_i$ is a transmit signal and $P_i$ is a transmit power for an associated component $w_i$ of the precoding matrix). A zero-forcing precoder (e.g., as an example of a pre-coding matrix or a beamforming matrix) may then be defined such that each component $w_i$ of the precoding matrix associated with a user i is orthogonal to every channel vector $h_j$ associated with users j where j≠i. Accordingly, the interference caused by the signal meant for one user may be effectively nullified by the use of the zero-forcing precoder $W_{zf}$. The orthogonality condition leads to the expression $W_{zf} = H(H^T H)^{-1}$ (or, with an added regularization term, $W_{zf} = H(H^T H + \sigma I)^{-1}$) that includes a matrix inversion (e.g., $(H^T H)^{-1}$ or $(H^T H + \sigma I)^{-1}$). Accordingly, the method and/or apparatus may be used to perform the calculation of the zero-forcing precoder $W_{zf}$ (e.g., a zero-forcing pre-coding matrix and/or a beamforming matrix) using fewer computation resources and/or processor cycles over a shorter time. The method and/or apparatus described herein may provide for reduced power consumption and reduced latency for transmission in the context of zero-forcing precoding and/or beamforming (for multiple wireless devices associated with a single transmitting device).

In some aspects, calculating the matrix inverse term may include calculating a series approximation. However, a series approximation may not converge or may converge to an acceptable accuracy after a number of terms that does not save computation resources. Accordingly, a decomposition-based series approximation method is proposed as below. The decomposition in some aspects may be a Chole sky decomposition, a LDL decomposition, a QR decomposition, or other decomposition involving at least one triangular matrix, e.g., a matrix with all entries above (for a lower triangular matrix) or below (for an upper triangular matrix) a diagonal being By applying a property of triangular matrices, the method and/or apparatus may ensure the series' convergence.

Figure 4:
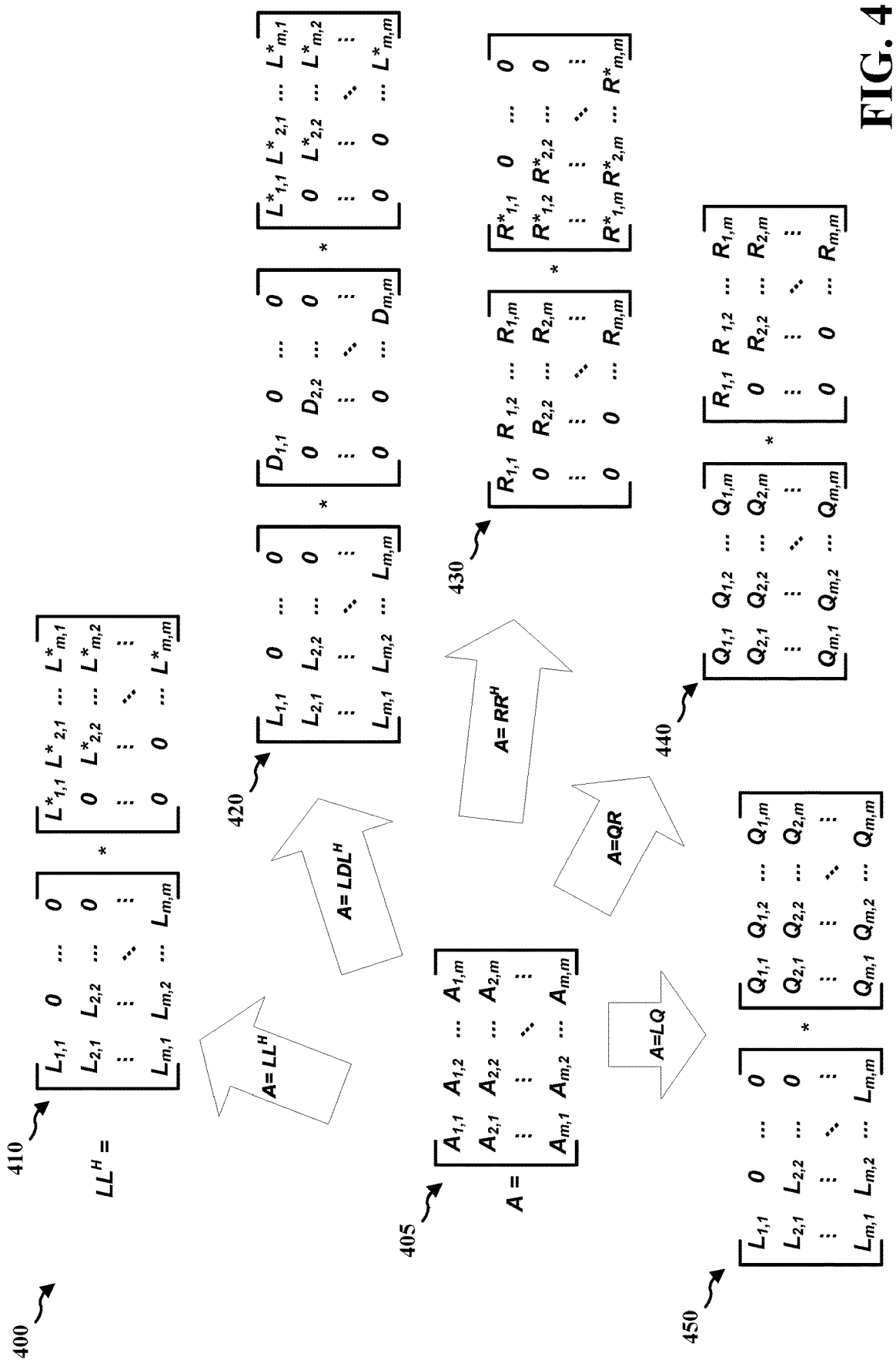
FIG. 4 is a diagram illustrating a set of possible decompositions of a matrix A in accordance with some aspects of the disclosure.

FIG. 4 is a diagram 400 illustrating a set of possible decompositions of a matrix A 405 in accordance with some aspects of the disclosure. For example, matrix A 405 may be a square matrix that is a Hermitian matrix (e.g., an invertible matrix, or a matrix that is equal to its own conjugate transpose) and, in some aspects, may also be positive definite. Matrix A 405 may be used to represent any matrix inverse term to be calculated, e.g., $(\beta I_P + Z^H Z)^{-1}$ as discussed above. For example, a Cholesky decomposition may be applied to the matrix A 405 (e.g., a positive-definite Hermitian) as in diagrams 410, 420, and 430. The Cholesky decomposition may include a decomposition into a first lower triangular matrix (L) pre-multiplying a Hermitian transpose (e.g., a conjugate transpose) of the first lower triangular matrix ($L^H$) ($A=LL^H$) as in diagram 410. In some aspects, the Cholesky decomposition may include a decomposition into a second lower triangular matrix pre-multiplying a diagonal matrix (D) pre-multiplying a Hermitian transpose of the second lower triangular matrix ($A=LDL^H$) as in diagram 420.

In some aspects, the Cholesky decomposition may include a decomposition into a first upper triangular matrix (R) pre-multiplying a Hermitian transpose of the first upper triangular matrix ($R^H$) ($A=RR^H$) as in diagram 430. The Cholesky decomposition may include a decomposition of into a first upper triangular matrix (R) pre-multiplying a diagonal matrix (D) pre-multiplying a Hermitian transpose of the first upper triangular matrix ($A=RDR^H$) similar to the decomposition in diagram 420. The decomposition may be a QR decomposition into a first square (and orthogonal and/or orthonormal) matrix (Q) pre-multiplying a second upper triangular matrix (R) (A=QR) as in diagram 440. In some aspects, the decomposition may be LQ decomposition into a third lower triangular matrix pre-multiplying a second square (orthogonal and/or orthonormal) matrix (Q) as in diagram 450, or similarly, A=QL or A=RQ. It is understood that a same symbol used to refer to a matrix (e.g., A, D, L, and/or R) may represent different matrices in different aspects that may share similar characteristics. For example, different matrices A may represent matrices with different values that are each an invertible matrix, or a matrix that is equal to its own conjugate transpose. Similarly, each matrix represented by D, L, and/or R may represent different matrices that are each a diagonal, lower triangular, and/or upper triangular matrix respectively.

Figure 5:
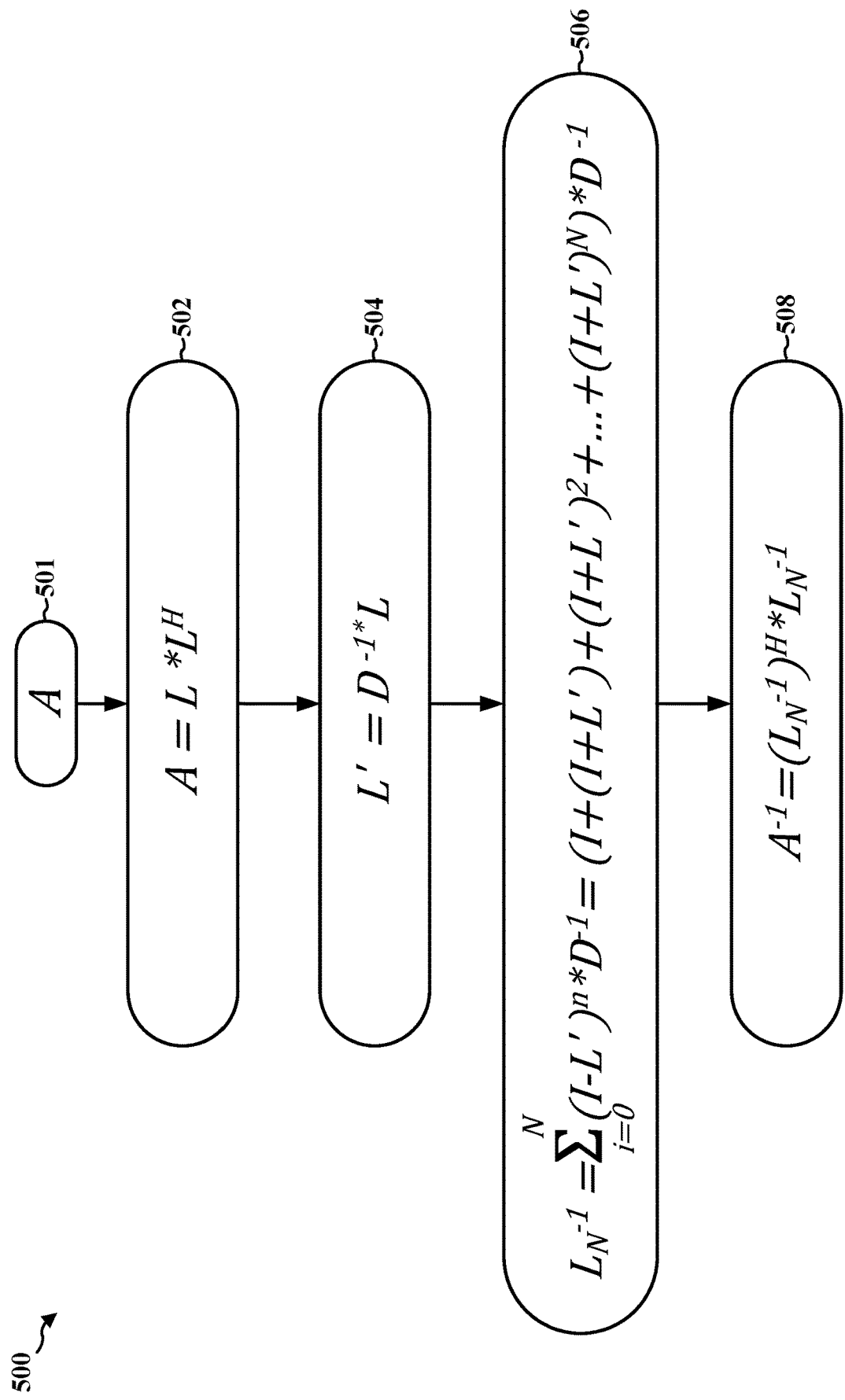
FIG. 5 is a diagram illustrating a set of operations using a Cholesky decomposition in accordance with some aspects of the disclosure.

FIG. 5 is a diagram 500 illustrating a set of operations using a Cholesky decomposition in accordance with some aspects of the disclosure. While the diagram 500 relates to a particular Cholesky decomposition ($A=LL^H$), similar operations may be performed for other decompositions. At 501, the matrix A to be inverted may be obtained (e.g., extracted from, or identified from, a received at least one signal or other received data). At 502, the matrix A to be inverted may be decomposed into a first lower triangular matrix pre-multiplying a conjugate transpose of the first lower triangular matrix ($A=LL^H$). In other implementations the matrix A may be decomposed as described in relation to FIG. 4. In some aspects, the first lower triangular matrix (L) may be normalized at 504 based on a diagonal matrix (D) which is based on the first lower triangular matrix to produce a second (normalized) lower triangular matrix (L'). For example, the normalization may result in a normalized lower triangular matrix (L') with values on the diagonal being equal to one.

An inverse of the first lower triangular matrix ($L^{-1}$) or the second lower triangular matrix ($L'^{-1}$) may be estimated at 506. For example, a series expansion with a number of terms N may be used to calculate an estimation of (or to estimate) an inverse of the first lower triangular matrix ($L_N^{-1}$) or of the second lower triangular matrix ($L'_N^{-1}$). For example, for the second lower triangular matrix the following series expansion and approximation may be used:

$$L'^{-1} = (I - (I - L'))^{-1} =$$
$$\sum_{n=0}^{P-1}(I-L')^n \approx \left(I + (I-L')^1 + (I-L')^2 + \ldots + (I-L')^N\right) = L'^{-1}_N,$$

where P is a power (or order) of the matrix A and N is the number of terms (e.g., a number less than P) of the series expansion used to estimate the inverse of the second lower triangular matrix. An estimation of the inverse of the first lower triangular matrix may be given by $$L_N^{-1} = \sum_{i=0}^{N}(I-L')^n D^{-1} = \left(I + (I-L') + (I-L')^2 + \ldots + (I-L')^N\right)D^{-1}.$$

In some aspects, the number of terms N used in the estimation, e.g., the series expansion, may be a variable value based on the magnitude of the terms in the expansion, such that a last term of the series used is a term in the series having a magnitude below a threshold magnitude (e.g., a known or configured tolerance for error). For example, a threshold magnitude ($\theta$) may be configured to represent an acceptable error for the estimation of the inverse of the first (or second) lower triangular matrix and additional terms of the series expansion may be calculated until the magnitude of the last term is below the threshold (e.g., $Max(abs((I-L')^N))<\theta$).

Based on the estimated inverse of the first lower triangular matrix (or the second lower triangular matrix) an inverse (or approximate inverse) of the matrix A (e.g., $A^{-1}$) may be calculated at 508. For example, using the estimated inverse of the first lower triangular matrix ($L_N^{-1}$) or of the second lower triangular matrix ($L'_N^{-1}$) the (approximate) inverse of the matrix A (e.g., $A^{-1}$) may be calculated as $A^{-1} = L_N^{-1^H} L_N^{-1}$ or $A^{-1} = L'^{-1^H}_N D^{-1} L'^{-1}_N$ (e.g., as approximations of $L^{-1^H} L^{-1}$ and $L'^{-1^H} D^{-1} L'^{-1}$, respectively). In the example of wireless communication and a matrix A associated with a received signal, the approximate inverse of the matrix A may then be used to process the received signal.

As discussed above, different decompositions may be used and similar operations may be applied. For example, any of the decompositions discussed in relation to FIG. 4 may be used, such as $A=LDL^H$ (or $A=RDR^H$) as in diagram 420, $A=RR^H$ as in diagram 430, or A=QR as in diagram 440. In the decomposition illustrated in diagram 420, the normalization may be included in the decomposition process based on the inclusion of the diagonal (and normalizing) matrix D. The inverse may be similarly calculated by $L^{-1} \approx (I+(I-L)^1+(I-L)^2+ \ldots +(I-L)^N)=L_N^{-1}$ (assuming L to already be normalized) for the $A=LDL^H$ decomposition, or $R^{-1} \approx (I+(I-R')^1+(I-R')^2+ \ldots +(I-R')^N)D^{-1}=R_N^{-1}$ for the $A=RR^H$, the $A=QR$, and the $A=RDR^H$, decomposition (where, for the decomposition $A=RDR^H$, $R'=R$ and $D^{-1}$ is not used or is replaced by an identity matrix I). Accordingly, the approximate inverse of the matrix A (e.g., $A^{-1}$) may be calculated as $A^{-1}=L_N^{-1^H} D^{-1} L_N^{-1}$, $A^{-1}=R_N^{-1^H} D^{-1} R_N^{-1}$, $A^{-1}=R_N^{-1^H} R_N^{-1}$, or $A^{-1}=R_N^{-1^H} Q^H$ where Q H is equivalent to $Q^{-1}$ which is a unitary matrix. References to a decomposition process throughout the description may refer to any process in which a first matrix is rewritten (or expressed) as a composition (or multiplication) of a plurality of different matrices.

Figure 6:
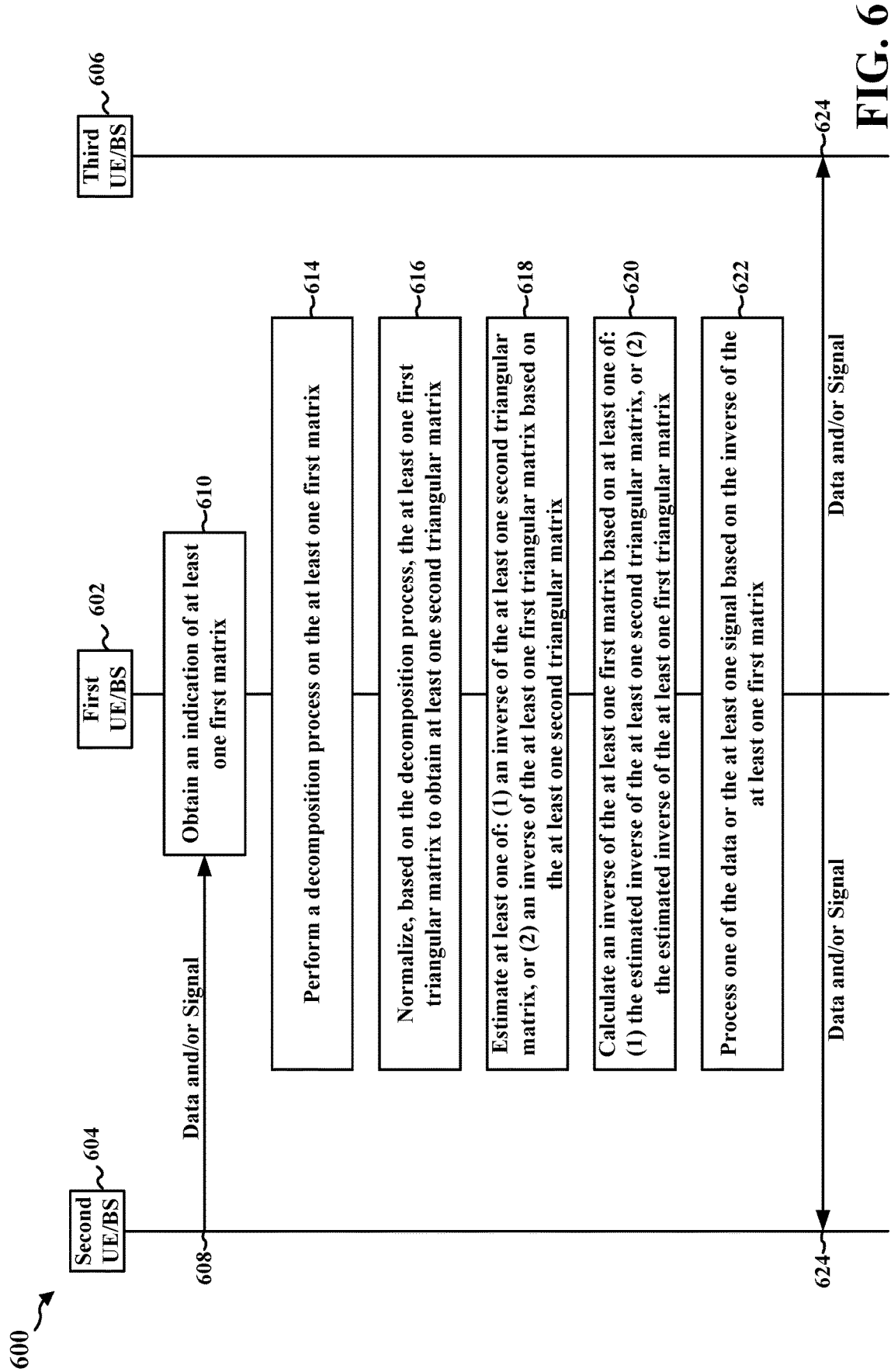
FIG. 6 is a call flow diagram illustrating signal transmissions and processing operations between a first device, a second device, and a third device.

FIG. 6 is a call flow diagram 600 illustrating a signal transmissions and processing operations in accordance with some aspects of the disclosure. The system may include a first device (e.g., a first UE/BS 602) that may be one of a first UE, a first base station, a first network node, or a first network entity. The system may also include a second device (e.g., a second UE/BS 604) that may be one of a second UE, a second base station, a second network node, or a second network entity. The second UE/BS 604 may transmit, and the first UE/BS 602 may receive, a data and/or signal 608. The first UE/BS 602, in some aspects, may be one of a second UE, a second base station, a second network node, or a second network entity. The system, in some aspects, may further include a third device (e.g., a third UE/BS 606) that may be one of a third UE, a third base station, a third network node, or a third network entity.

At 610, the first UE/BS 602 may obtain one or more of data or at least one signal associated with at least one first matrix (A). In some aspects, the at least one first matrix is at least one square matrix, such that a length of the at least one first matrix is equal to a width of the at least one first matrix. The width and length of the at least one square matrix, in some aspects, may be associated with, or determine, a power (P) or order of the matrix. In some aspects, the at least one first matrix is at least one positive-definite Hermitian matrix that is equal to a conjugate transpose of the at least one first matrix. Obtaining the one or more of the data or the at least one signal associated with at least one first matrix, in some aspects, may include receiving one of data or at least one signal (e.g., via a wireless transmission) associated with the at least one first matrix from a second device. For example, referring to FIGS. 4 and 5, the device may receive, at 501, an indication of the matrix A 405.

At 614, the first UE/BS 602 may perform a decomposition process on the at least one first matrix to obtain at least one first triangular matrix (e.g., lower triangular matrix L or upper triangular matrix R). As discussed in relation to FIGS. 4 and 5 above, the decomposition process at 502, in some aspects, may be one of a Cholesky decomposition (e.g., one of $A=LL^H$, $A=RR^H$, $A=LDL^H$, $A=RDR^H$), a Cholesky factorization, and/or a first decomposition process that decomposes the at least one first matrix into a first lower triangular matrix pre-multiplying a first upper triangular matrix ($LL^H$). In some aspects, the decomposition may include a second decomposition process that decomposes the at least one first matrix into a second upper triangular matrix pre-multiplying a second lower triangular matrix ($RR^H$), a matrix decomposition, and/or a matrix factorization. The decomposition, in some aspects, may include a second decomposition process that decomposes the at least one first matrix into an orthogonal (or orthonormal) matrix (Q) and a third triangular matrix (R or L). The at least one first triangular matrix, in some aspects, may be one of the first lower triangular matrix (L), the second upper triangular matrix (R), or the third triangular matrix (R or L).

In some aspects, the first UE/BS 602 may normalize, at 616, the at least one first triangular matrix to obtain at least one (normalized) second triangular matrix (L') based on the decomposition process. Normalizing the at least one first triangular matrix (triangular matrix L to produce L'), in some aspects, may include pre-multiplying the at least one first triangular matrix by an inverse of at least one diagonal matrix associated with the at least one first triangular matrix (e.g., $L'=D^{-1} L$). For example, referring to FIG. 5, the device may perform operation 504 (e.g., $L'=D^{-1} L$) to produce a normalized lower triangular matrix L'. As described above, other implementations may normalize an upper triangular matrix R to produce a normalized upper triangular matrix R'.

The at least one diagonal matrix, in some aspects, may be a diagonal matrix whose diagonal elements are equal to the at least one first triangular matrix. In some aspects, the normalization at 616 may be combined with the decomposition process at 614 such that the decomposition process produces a normalized triangular matrix. For example, the decomposition ($A=LDL^H$) illustrated in diagram 420 of FIG. 4 in which the first lower triangular matrix (L) and the Hermitian transpose of the first lower triangular matrix ($L^H$) are both normalized with values on the diagonal being equal to one. Similarly, the decomposition ($A=RDR^H$) as described in relation to FIG. 4 in which the first lower triangular matrix (R) and the Hermitian transpose of the first lower triangular matrix ($R^H$) are both normalized with values on the diagonal being equal to one.

At 618, the first UE/BS 602 may estimate at least one of: (1) an inverse of the at least one second triangular matrix ($L'_N^{-1}$ or $R'_N^{-1}$), or (2) an inverse of the at least one first triangular matrix ($L_N^{-1}$ or $R_N^{-1}$) based on the at least one second triangular matrix (L' or R'). In some aspects, estimating the inverse of the at least one second triangular matrix or the inverse of the at least one first triangular matrix may include calculating a portion of a series approximating one of the inverse of the at least one second triangular matrix or the inverse of the at least one first triangular matrix. For example, a series $$\sum_{n=0}^{P-1}(I-T')^n$$

used to calculate an inverse for a triangular matrix (T) (e.g., lower triangular matrix L or L' and/or upper triangular matrix R or R') may be truncated after a number of terms N such that the inverse of L or L' may be estimated as $(I+(I-L')^1+(I-L')^2+ \ldots +(I-L')^N)D^{-1}$ or $(I+(I-L')^1+(I-L')^2+ \ldots +(I-L')^N)$ and the inverse of R or R' may be estimated as $(I+(I-R')^1+(I-R')^2+ \ldots +(I-R')^N)D^{-1}$ or $(I+(I-R')^1+(I-R')^2+ \ldots +(I-R')^N)$.

In some aspects, the series includes a number of terms (N) that is less than an order (P) which denotes the number of rows of the at least one second triangular matrix (L' or R') or the at least one first triangular matrix (L or R). The portion of the series, in some aspects, may include a fixed number of terms in the series. In some aspects, the portion of the series may include a first number of terms based on a threshold magnitude (θ), and a last term in the portion of the series may be a term in the series having a magnitude function of the last term in the portion of the series below the threshold magnitude (e.g., M ax (abs $((I-L')^N))<θ$). For example, referring to FIG. 5, the device may perform operation 506 to estimate an inverse of the triangular matrix (e.g., the lower triangular matrix L or L').

At 620, the first UE/BS 602 may calculate an inverse of the at least one first matrix $A^{-1}$ based on at least one of: (1) the estimated inverse of the at least one second triangular matrix ($L'_N{}^{-1}$ or $R'_N{}^{-1}$), or (2) the estimated inverse of the at least one first triangular matrix ($L_N{}^{-1}$ or $R_N{}^{-1}$). In some aspects, the calculated inverse of the at least one first matrix $A^{-1}$ is an approximation of (or approximates) an exact inverse of the at least one first matrix A calculated based on at least one of: (1) the estimated inverse of the at least one second triangular matrix ($L'_N{}^{-1}$ or $R'_N{}^{-1}$), or (2) the estimated inverse of the at least one first triangular matrix ($L_N{}^{-1}$ or $R_N{}^{-1}$). For example, referring to FIG. the device may calculate an inverse of the first matrix A 501 at 508.

At 622, the first UE/BS 602 may process one of the data or the at least one signal obtained at 610 based on the inverse of the at least one first matrix $A^{-1}$. For example, a signal may be generated based on a zero-forcing precoding matrix calculated and/or determined based on the inverse of the at least one first matrix. Finally, at 624, the first UE/BS 602 may transmit, and the second UE/BS 604 and/or the third UE/BS 606 may receive, the data and/or signal 624 based on the inverse of the at least one first matrix or the processed one of the data or the at least one signal. Accordingly, at 624, the first UE/BS 602 may optionally transmit the data and/or signal to the first UE/BS 602, and/or the first UE/BS 602 may optionally transmit the data and/or signal to the third UE/BS 606. In some aspects, the data and/or signal 624 may be an encoded signal encoded by the first UE/BS 602 based on the inverse of the at least one first matrix. For example, the data and/or signal 624 may include a signal for both the second UE/BS 604 and the third UE/BS 606 based on a zero-forcing precoding matrix calculated and/or determined based on the inverse of the at least one first matrix.

The method and apparatus described herein may reduce a number of unit operations performed in a digital signal processor (DSP) when calculating an inverse matrix, as described in relation to FIGS. 4-6. As discussed above, the method and apparatus described herein may reduce the number of unit operations (e.g., complex multiply and accumulate (CMAC) operations) by truncating (e.g., dropping less significant terms of) a series expansion used to calculate and/or estimate the inverse matrix. Truncating the series expansion, in some aspects, may provide a complexity gain, e.g., a lower processing latency, a lower power consumption, and/or a higher power efficiency, of an apparatus (hardware such as a DSP) configured to implement the method. Accordingly, the method and apparatus described herein may address a problem specifically related to configuring computer hardware for improving digital signal processing in a communication network. The method and apparatus described herein may provide a specific solution, e.g., truncating a set of calculations used for a matrix inversion calculation associated with digital signal processing, to improve the performance of a device (e.g., a DSP, a processor, or a device including a plurality of processors) for signal processing. As can be seen from the above description, the method and/or apparatus described herein may provide improvements related to one or more of power consumption or latency associated with signal processing in multiple contexts (e.g., MMSE-IRC, UL Rx beamforming, zero-forcing precoding, etc.) for which a matrix inversion is performed (e.g., a matrix inverse is calculated). The method and apparatus described herein may be provided to improve the speed and power consumption associated with a processor configured to perform a set of calculations and/or computations associated with a matrix inversion operation (e.g., a set of calculations and/or computations associated with a matrix inversion operation for signal processing). Specifically, in some aspects, the method and/or apparatus described herein may reduce latency, and thereby increase the speed, associated with signal processing and a throughput of a device performing the signal processing.

Figure 7:
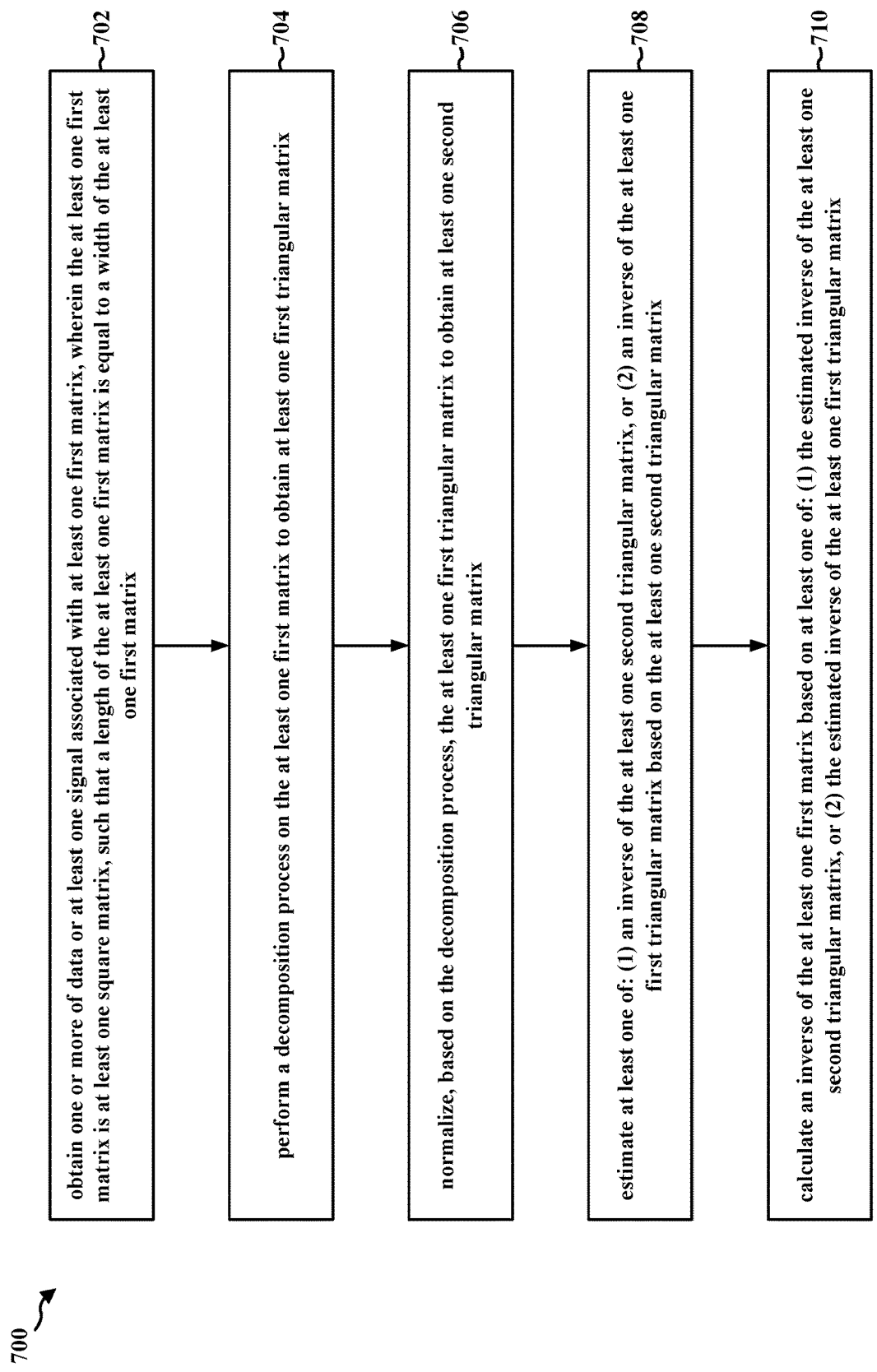
FIG. 7 is a flowchart of a method of wireless communication.

FIG. 7 is a flowchart 700 of a method of wireless communication. The method may be performed by a device including devices associated with wireless communication such as a wireless device (e.g., the UE 104; the apparatus 904) or a network node (e.g., the base station 102; the network entity 1002). At 702, the device may obtain one or more of data or at least one signal associated with at least one first matrix (A). In some aspects, the at least one first matrix is at least one square matrix, such that a length of the at least one first matrix is equal to a width of the at least one first matrix. The width and length of the at least one square matrix, in some aspects, may be associated with, or determine, a power (P) or order of the matrix. For example, 702 may be performed by application processor 906, cellular baseband processor 924, transceiver(s) 922, antenna(s) 980, CU processor 1012, DU processor 1032, RU processor 1042, transceiver(s) 1046, antenna(s) 1080, and/or HMI component 198 of FIGS. 9 and 10. In some aspects, the at least one first matrix is at least one positive-definite Hermitian matrix that is equal to a conjugate transpose of the at least one first matrix. Obtaining the one or more of the data or the at least one signal associated with the at least one first matrix, in some aspects, may include receiving one of data or at least one signal (e.g., via a wireless transmission) associated with the at least one first matrix from a second device. For example, referring to FIGS. 4-6, the device may receive, at 501 or 610, an indication of the matrix A 405 (e.g., in data and/or signal 608).

At 704, the device may perform a decomposition process on the at least one first matrix to obtain at least one first triangular matrix (e.g., lower triangular matrix L or upper triangular matrix R). For example, 706 may be performed by application processor 906, cellular baseband processor 924, CU processor 1012, DU processor 1032, RU processor 1042, and/or HMI component 198 of FIGS. 9 and 10. As discussed in relation to FIGS. 4-6 above, the decomposition process at 502 or 614, in some aspects, may be one of a Cholesky decomposition (e.g., one of $A=LL^H$, $A=RR^H$, or similarly, $A=LDL^H$, $A=RDR^H$), a Cholesky factorization, and/or a first decomposition process that decomposes the at least one first matrix into a first lower triangular matrix pre-multiplying a first upper triangular matrix ($LL^H$). In some aspects, the decomposition may include a second decomposition process that decomposes the at least one first matrix into a second upper triangular matrix pre-multiplying a second lower triangular matrix ($RR^H$), a matrix decomposition, and/or a matrix factorization. The decomposition, in some aspects, may include a second decomposition process that decomposes the at least one first matrix into an orthogonal (or orthonormal) matrix (Q) and a third triangular matrix (R or L) (e.g., A=QR, A=QL, A=RQ, A=LQ). The at least one first triangular matrix, in some aspects, may be one of the first lower triangular matrix (L), the second upper triangular matrix (R), or the third triangular matrix (R or L).

In some aspects, the device may normalize, at 706, the at least one first triangular matrix to obtain at least one (normalized) second triangular matrix (L' or R') based on the decomposition process. For example, 706 may be performed by application processor 906, cellular baseband processor 924, CU processor 1012, DU processor 1032, RU processor 1042, and/or HMI component 198 of FIGS. 9 and 10. Normalizing the at least one first triangular matrix (triangular matrix L to produce L'), in some aspects, may include pre-multiplying the at least one first triangular matrix by an inverse of at least one diagonal matrix associated with the at least one first triangular matrix (e.g., L'=D$^{-1}$ L). For example, referring to FIGS. 5 and 6, the device may perform operation 504 (e.g., L'=D$^{-1}$ L) or 616 to produce a normalized lower triangular matrix L'. As described above, other implementations may normalize an upper triangular matrix R to produce a normalized upper triangular matrix R'.

The at least one diagonal matrix, in some aspects, may be a diagonal matrix whose diagonal elements are equal to the at least one first triangular matrix. In some aspects, the normalization at 706 may be combined with the decomposition process at 704 such that the decomposition process produces a normalized triangular matrix. For example, the decomposition (A=LDL$^H$) illustrated in diagram 420 of FIG. 4 in which the first lower triangular matrix (L) and the Hermitian transpose of the first lower triangular matrix (L$^H$) are both normalized with values on the diagonal being equal to one. Similarly, the decomposition (A=RDR$^H$) as described in relation to FIG. 4 in which the first lower triangular matrix (R) and the Hermitian transpose of the first lower triangular matrix (R$^H$) are both normalized with values on the diagonal being equal to one.

At 708, the device may estimate at least one of: (1) an inverse of the at least one second triangular matrix (L'$_N^{-1}$ or R'$_N^{-1}$), or (2) an inverse of the at least one first triangular matrix (L$_N^{-1}$ or R$_N^{-1}$) based on the at least one second triangular matrix (L' or R'). For example, 708 may be performed by application processor 906, cellular baseband processor 924, CU processor 1012, DU processor 1032, RU processor 1042, and/or HMI component 198 of FIGS. 9 and 10. In some aspects, estimating the inverse of the at least one second triangular matrix or the inverse of the at least one first triangular matrix may include calculating a portion of a series approximating one of the inverse of the at least one second triangular matrix or the inverse of the at least one first triangular matrix. For example, a series $$\sum_{n=0}^{P-1}(I-T')^n$$

used to calculate an inverse for a triangular matrix (T) (e.g., lower triangular matrix L or L' and/or upper triangular matrix R or R') may be truncated after a number of terms N such that the inverse of L or L' may be estimated as (I+(I−L')$^1$+(I−L')$^2$+ . . . +(I−L')$^N$)D$^{-1}$ or (I+(I−L')$^1$+(I−L')$^2$+ . . . +(I−L')$^N$) and the inverse of R or R' may be estimated as (I+(I−R')$^1$+(I−R')$^2$+ . . . +(I−R')$^N$)D$^{-1}$ or (I+(I−R')$^1$+(I−R')$^2$+ . . . +(I−R')$^N$).

In some aspects, the series includes a number of terms (N) that is less than an order (P) which denotes the number of rows of the at least one second triangular matrix (L' or R') or the at least one first triangular matrix (L or R). The portion of the series, in some aspects, may include a fixed number of terms in the series. In some aspects, the portion of the series may include a first number of terms based on a threshold magnitude (θ), and a last term in the portion of the series may be a term in the series having a magnitude function of the last term in the portion of the series below the threshold magnitude (e.g., Max(abs ((I−L')$^N$))<θ). For example, referring to FIGS. 5 and 6, the device may perform operation 506 or 618 to estimate an inverse of the triangular matrix (e.g., the lower triangular matrix L or L').

At 710, the device may calculate an inverse of the at least one first matrix A$^{-1}$ based on at least one of: (1) the estimated inverse of the at least one second triangular matrix (L'$_N^{-1}$ or R'$_N^{-1}$), or (2) the estimated inverse of the at least one first triangular matrix (L$_N^{-1}$ or R$_N^{-1}$). For example, 710 may be performed by application processor 906, cellular baseband processor 924, CU processor 1012, DU processor 1032, RU processor 1042, and/or HMI component 198 of FIGS. 9 and 10. In some aspects, the calculated inverse of the at least one first matrix A$^{-1}$ is an approximation of (or approximates) an exact inverse of the at least one first matrix A calculated based on at least one of: (1) the estimated inverse of the at least one second triangular matrix (L'$_N^{-1}$ or R'$_N^{-1}$), or (2) the estimated inverse of the at least one first triangular matrix (L$_N^{-1}$ or R$_N^{-1}$). For example, referring to FIGS. 5 and 6, the device may calculate an inverse of the first matrix A 501 at 508 or 620. The device may process one of the data or the at least one signal received at 702 based on the inverse of the at least one first matrix A$^{-1}$.

The device may transmit, for a third device, at least one signal based on the inverse of the at least one first matrix or the processed one of the data or the at least one signal. In some aspects, the at least one signal may be an encoded signal encoded by the device based on the inverse of the at least one first matrix. For example, referring to FIG. 6, the device may transmit data and/or signal 624.

Figure 8:
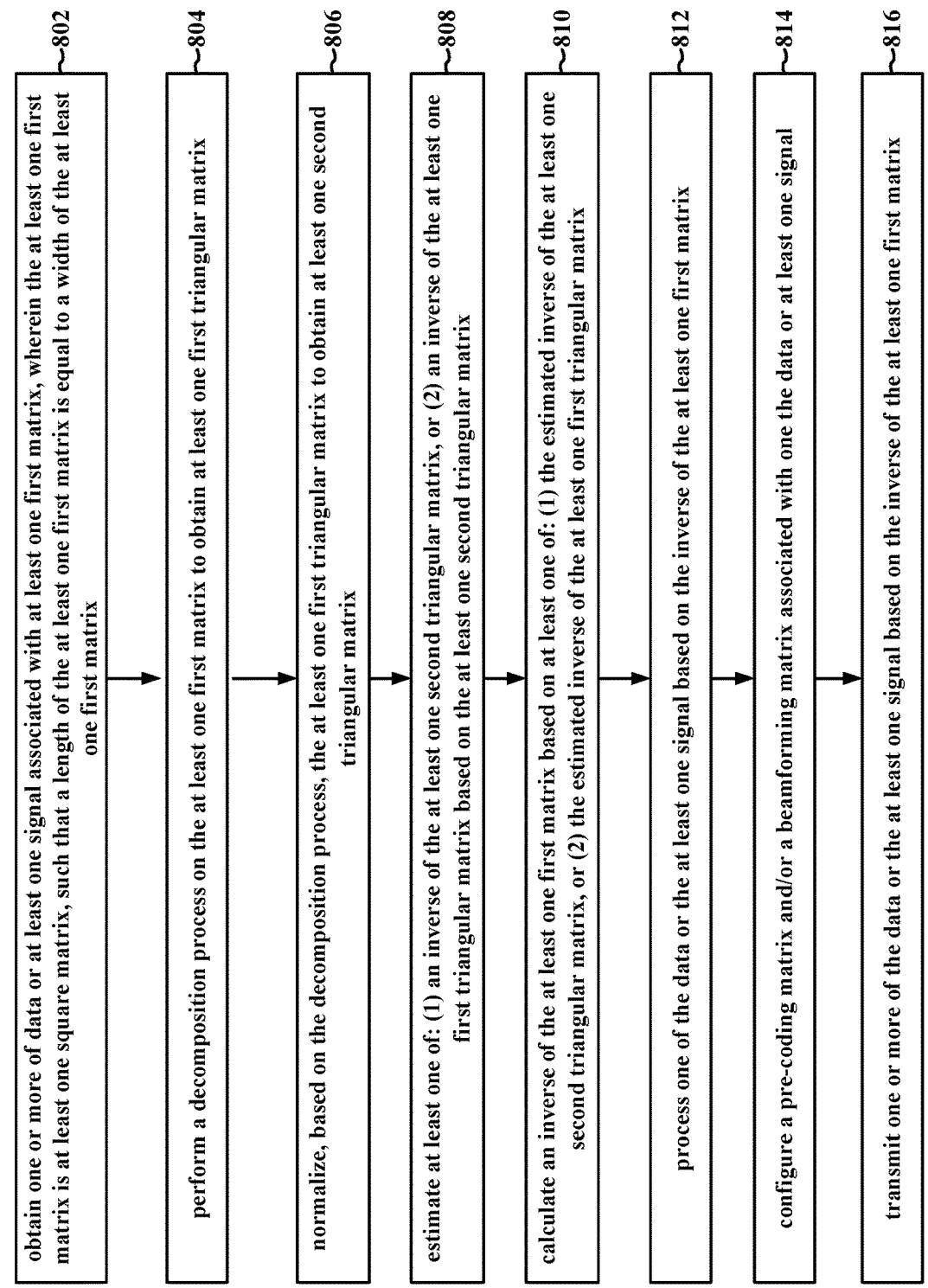
FIG. 8 is a flowchart of a method of wireless communication.

FIG. 8 is a flowchart 800 of a method of wireless communication. The method may be performed by a device including devices associated with wireless communication such as a wireless device (e.g., the UE 104; the apparatus 904) or a network node (e.g., the base station 102; the network entity 1002). At 802, the device may obtain one or more of data or at least one signal associated with at least one first matrix (A). In some aspects, the at least one first matrix is at least one square matrix, such that a length of the at least one first matrix is equal to a width of the at least one first matrix. The width and length of the at least one square matrix, in some aspects, may be associated with, or determine, a power (P) or order of the matrix. For example, 802 may be performed by application processor 906, cellular baseband processor 924, transceiver(s) 922, antenna(s) 980, CU processor 1012, DU processor 1032, RU processor 1042, transceiver(s) 1046, antenna(s) 1080, and/or HMI component 198 of FIGS. 9 and 10. In some aspects, the device may obtain one or more of the data or the at least one signal at 802 by receiving one or more of the data or the at least one signal via one or more antennas based on a pre-coding (or beamforming) matrix for an uplink beamforming operation (e.g., an UL Rx beamforming operation). The pre-coding matrix may be configured based on the operations described below in relation to operations 804 to 814. In some aspects, the at least one first matrix is at least one positive-definite Hermitian matrix that is equal to a conjugate transpose of the at least one first matrix. Obtaining one or more of the data or the at least one signal associated with the at least one first matrix, in some aspects, may include receiving one of data or at least one signal (e.g., via a wireless transmission) associated with the at least one first matrix from a second device. For example, referring to FIGS. 4-6, the device may receive, at 501 or 610, an indication of the matrix A 405 (e.g., in data and/or signal 608).

At 804, the device may perform a decomposition process on the at least one first matrix to obtain at least one first triangular matrix (e.g., lower triangular matrix L or upper triangular matrix R). For example, 804 may be performed by application processor 906, cellular baseband processor 924, CU processor 1012, DU processor 1032, RU processor 1042, and/or HMI component 198 of FIGS. 9 and 10. As discussed in relation to FIGS. 4-6 above, the decomposition process at 502 or 614, in some aspects, may be one of a Cholesky decomposition (e.g., one of $A=LL^H$, $A=RR^H$, $A=LDL^H$, $A=RDR^H$), a Cholesky factorization, and/or a first decomposition process that decomposes the at least one first matrix into a first lower triangular matrix pre-multiplying a first upper triangular matrix ($LL^H$). In some aspects, the decomposition may include a second decomposition process that decomposes the at least one first matrix into a second upper triangular matrix pre-multiplying a second lower triangular matrix ($RR^H$), a matrix decomposition, and/or a matrix factorization. The decomposition, in some aspects, may include a second decomposition process that decomposes the at least one first matrix into an orthogonal (or orthonormal) matrix (Q) and a third triangular matrix (R or L). The at least one first triangular matrix, in some aspects, may be one of the first lower triangular matrix (L), the second upper triangular matrix (R), or the third triangular matrix (R or L).

In some aspects, the device may normalize, at 806, the at least one first triangular matrix to obtain at least one (normalized) second triangular matrix (L') based on the decomposition process. For example, 806 may be performed by application processor 906, cellular baseband processor 924, CU processor 1012, DU processor 1032, RU processor 1042, and/or HMI component 198 of FIGS. 9 and 10. Normalizing the at least one first triangular matrix (triangular matrix L to produce L'), in some aspects, may include pre-multiplying the at least one first triangular matrix by an inverse of at least one diagonal matrix associated with the at least one first triangular matrix (e.g., $L'=D^{-1}L$). For example, referring to FIGS. 5 and 6, the device may perform operation 504 (e.g., $L'=D^{-1}L$) or 616 to produce a normalized lower triangular matrix L'. As described above, other implementations may normalize an upper triangular matrix R to produce a normalized upper triangular matrix R'.

The at least one diagonal matrix, in some aspects, may be a diagonal matrix whose diagonal elements are equal to the at least one first triangular matrix. In some aspects, the normalization at 806 may be combined with the decomposition process at 804 such that the decomposition process produces a normalized triangular matrix. For example, the decomposition ($A=LDL^H$) illustrated in diagram 420 of FIG. 4 in which the first lower triangular matrix (L) and the Hermitian transpose of the first lower triangular matrix ($L^H$) are both normalized with values on the diagonal being equal to one. Similarly, the decomposition ($A=RDR^H$) as described in relation to FIG. 4 in which the first lower triangular matrix (R) and the Hermitian transpose of the first lower triangular matrix ($R^H$) are both normalized with values on the diagonal being equal to one.

At 808, the device may estimate at least one of: (1) an inverse of the at least one second triangular matrix ($L'_N{}^{-1}$ or $R'_N{}^{-1}$), or (2) an inverse of the at least one first triangular matrix ($L_N{}^{-1}$ or $R_N{}^{-1}$) based on the at least one second triangular matrix (L' or R'). For example, 808 may be performed by application processor 906, cellular baseband processor 924, CU processor 1012, DU processor 1032, RU processor 1042, and/or HMI component 198 of FIGS. 9 and 10. In some aspects, estimating the inverse of the at least one second triangular matrix or the inverse of the at least one first triangular matrix may include calculating a portion of a series approximating one of the inverse of the at least one second triangular matrix or the inverse of the at least one first triangular matrix. For example, a series $$\sum_{n=0}^{P-1}(I-T')^n$$

used to calculate an inverse for a triangular matrix (T) (e.g., lower triangular matrix L or L' and/or upper triangular matrix R or R') may be truncated after a number of terms N such that the inverse of L or L' may be estimated as $(I+(I-L')^1+(I-L')^2+ \ldots +(I-L')^N)D^{-1}$ or $(I+(I-L')^1+(I-L')^2+ \ldots +(I-L')^N)$ and the inverse of R or R' may be estimated as $(I+(I-R')^1+(I-R')^2+ \ldots +(I-R')^N)D^{-1}$ or $(I+(I-R')^1+(I-R')^2+ \ldots +(I-R')^N)$.

In some aspects, the series includes a number of terms (N) that is less than an order (P) which denotes the number of rows of the at least one second triangular matrix (L' or R') or the at least one first triangular matrix (L or R). The portion of the series, in some aspects, may include a fixed number of terms in the series. In some aspects, the portion of the series may include a first number of terms based on a threshold magnitude (θ), and a last term in the portion of the series may be a term in the series having a magnitude function of the last term in the portion of the series below the threshold magnitude (e.g., $Max(abs((I-L')^N))<θ$). For example, referring to FIGS. 5 and 6, the device may perform operation 506 or 618 to estimate an inverse of the triangular matrix (e.g., the lower triangular matrix L or L').

At 810, the device may calculate an inverse of the at least one first matrix $A^{-1}$ based on at least one of: (1) the estimated inverse of the at least one second triangular matrix ($L'_N{}^{-1}$ or $R'_N{}^{-1}$), or (2) the estimated inverse of the at least one first triangular matrix ($L_N{}^{-1}$ or $R_N{}^{-1}$). For example, 810 may be performed by application processor 906, cellular baseband processor 924, CU processor 1012, DU processor 1032, RU processor 1042, and/or HMI component 198 of FIGS. 9 and 10. In some aspects, the calculated inverse of the at least one first matrix $A^{-1}$ is an approximation of (or approximates) an exact inverse of the at least one first matrix A calculated based on at least one of: (1) the estimated inverse of the at least one second triangular matrix ($L'_N{}^{-1}$ or $R'_N{}^{-1}$), or (2) the estimated inverse of the at least one first triangular matrix ($L_N{}^{-1}$ or $R_N{}^{-1}$). For example, referring to FIGS. 5 and 6, the device may calculate an inverse of the first matrix A 501 at 508 or 620.

At 812, the device may process one or more of the data or the at least one signal received at 802 based on the inverse of the at least one first matrix $A^{-1}$. For example, 812 may be performed by application processor 906, cellular baseband processor 924, CU processor 1012, DU processor 1032, RU processor 1042, and/or HMI component 198 of FIGS. 9 and 10. In some aspects, the device may process, at 812, one or more of the data or the at least one signal received at 802 by performing an MMSE operation on one or more of the data or the at least one signal. Referring to FIG. 6, the first UE/BS 602 may process, at 622, the data and/or signal 608 obtained at 610 based on the inverse of the at least one first matrix $A^{-1}$ calculated at 620.

At 814, the device may configure, based on the inverse of the at least one first matrix calculated at 810, a pre-coding matrix and/or a beamforming matrix associated with one or more of the data or the at least one signal. For example, 814 may be performed by application processor 906, cellular baseband processor 924, CU processor 1012, DU processor 1032, RU processor 1042, and/or HMI component 198 of FIGS. 9 and 10. The pre-coding matrix, in some aspects, may be a zero-forcing matrix for a MIMO application. For example, for a beamforming operation, a device may calculate a zero-forcing precoding matrix using a calculated inverse of a matrix associated with a communication channel as described above.

Finally, at 816, the device may transmit one or more of the data or the at least one signal based on the calculated inverse of the at least one first matrix. For example, 816 may be performed by application processor 906, cellular baseband processor 924, transceiver(s) 922, antenna(s) 980, CU processor 1012, DU processor 1032, RU processor 1042, transceiver(s) 1046, antenna(s) 1080, and/or HMI component 198 of FIGS. 9 and 10. Transmitting the one or more of the data or the at least one signal at 816, in some aspects, may include transmitting, for at least one of the second device or a third device, one or more of the processed data or the processed at least one signal based on the calculated inverse of the at least one first matrix. In some aspects, the at least one signal may be an encoded signal encoded by the device based on the inverse of the at least one first matrix. In some aspects, the one or more of the data or the at least one signal may be transmitted via one or more antennas based on the precoding matrix or the beamforming matrix configured at 814 (e.g., a zero-forcing precoding matrix) based on the inverse of the at least one matrix. For example, referring to FIG. 6, the device may transmit data and/or signal 624 to one or more of second UE/BS 604 and/or third UE/BS 606.

Figure 9:
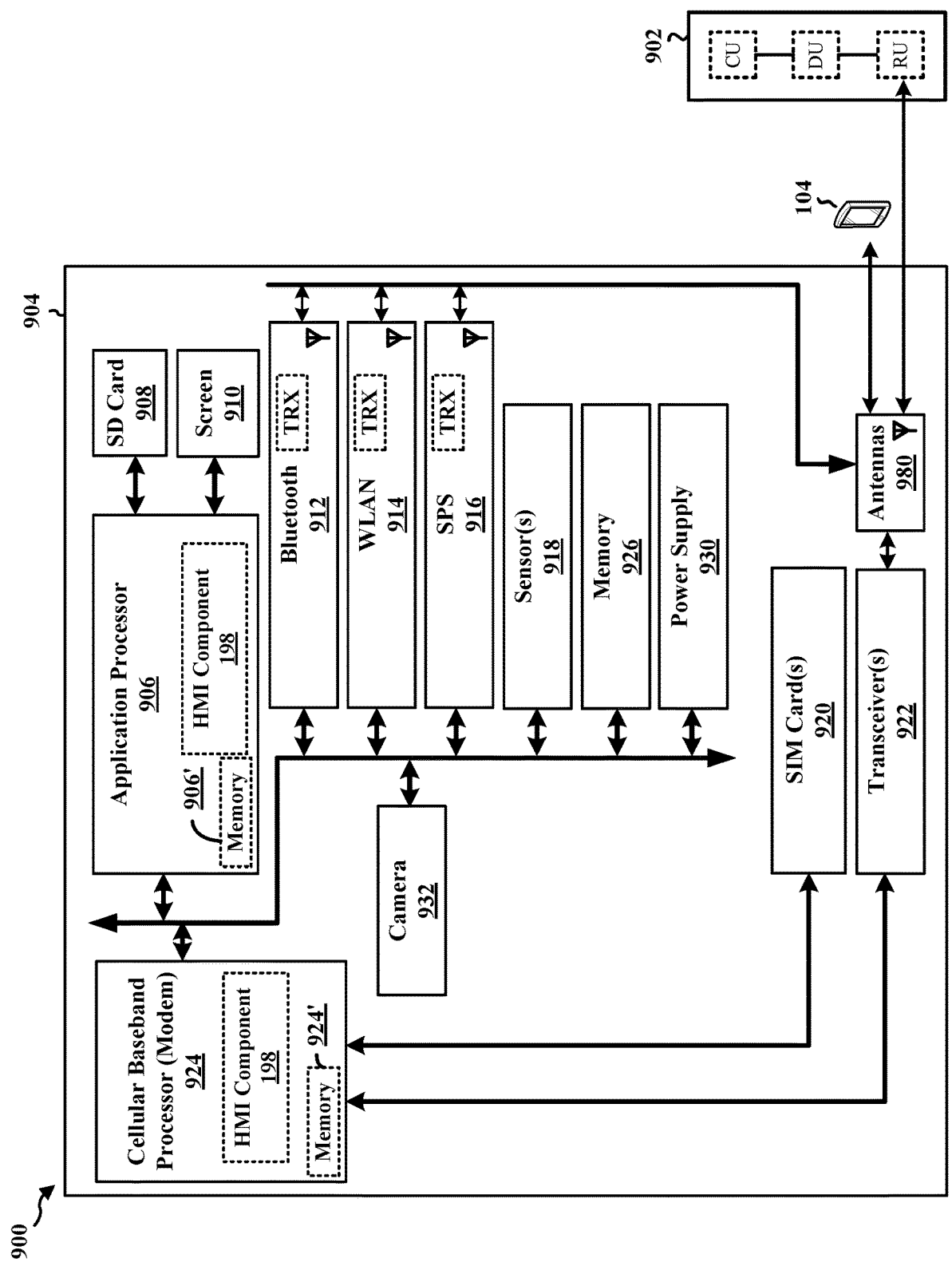
FIG. 9 is a diagram illustrating an example of a hardware implementation for an apparatus.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see 350 of FIG. 3) and include the additional modules of the apparatus 904.

As discussed supra, the HMI component 198 is configured to obtain one or more of data or at least one signal associated with at least one first matrix, where the at least one first matrix is at least one square matrix, such that a length of the at least one first matrix is equal to a width of the at least one first matrix; perform a decomposition process on the at least one first matrix to obtain at least one first triangular matrix; normalize, based on the decomposition process, the at least one first triangular matrix to obtain at least one second triangular matrix; estimate at least one of (1) an inverse of the at least one second triangular matrix, or (2) an inverse of the at least one first triangular matrix based on the at least one second triangular matrix; calculate an inverse of the at least one first matrix based on at least one of (1) the estimated inverse of the at least one second triangular matrix, or (2) the estimated inverse of the at least one first triangular matrix; and transmit at least one transmission based on the inverse of the at least one first matrix. The HMI component 198 may be within the cellular baseband processor 924, the application processor 906, or both the cellular baseband processor 924 and the application processor 906. The HMI component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, includes means for obtaining an indication of at least one first matrix. The apparatus 904, and in particular the cellular baseband processor 924 and/or the application processor 906, may also include means for performing a decomposition process on the at least one first matrix to obtain at least one first triangular matrix. The apparatus 904, and in particular the cellular baseband processor 924 and/or the application processor 906, may also include means for normalizing, based on the decomposition process, the at least one first triangular matrix to obtain at least one second triangular matrix. The apparatus 904, and in particular the cellular baseband processor 924 and/or the application processor 906, may also include means for estimating at least one of: (1) an inverse of the at least one second triangular matrix, or (2) an inverse of the at least one first triangular matrix based on the at least one second triangular matrix. The apparatus 904, and in particular the cellular baseband processor 924 and/or the application processor 906, may also include means for calculating an inverse of the at least one first matrix based on at least one of: (1) the estimated inverse of the at least one second triangular matrix, or (2) the estimated inverse of the at least one first triangular matrix. The apparatus 904, and in particular the cellular baseband processor 924 and/or the application processor 906, may also include means for calculating a portion of a series approximating one of the inverse of the at least one second triangular matrix or the inverse of the at least one first triangular matrix. The apparatus 904, and in particular the cellular baseband processor 924 and/or the application processor 906, may also include means for receiving one of data or at least one signal associated with the at least one first matrix from a second device. The apparatus 904, and in particular the cellular baseband processor 924 and/or the application processor 906, may also include means for processing one of the data or the at least one signal based on the inverse of the at least one first matrix. The apparatus may include means for performing any of the aspects described in connection with the flowcharts in FIGS. 7-8. The means may be the HMI component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
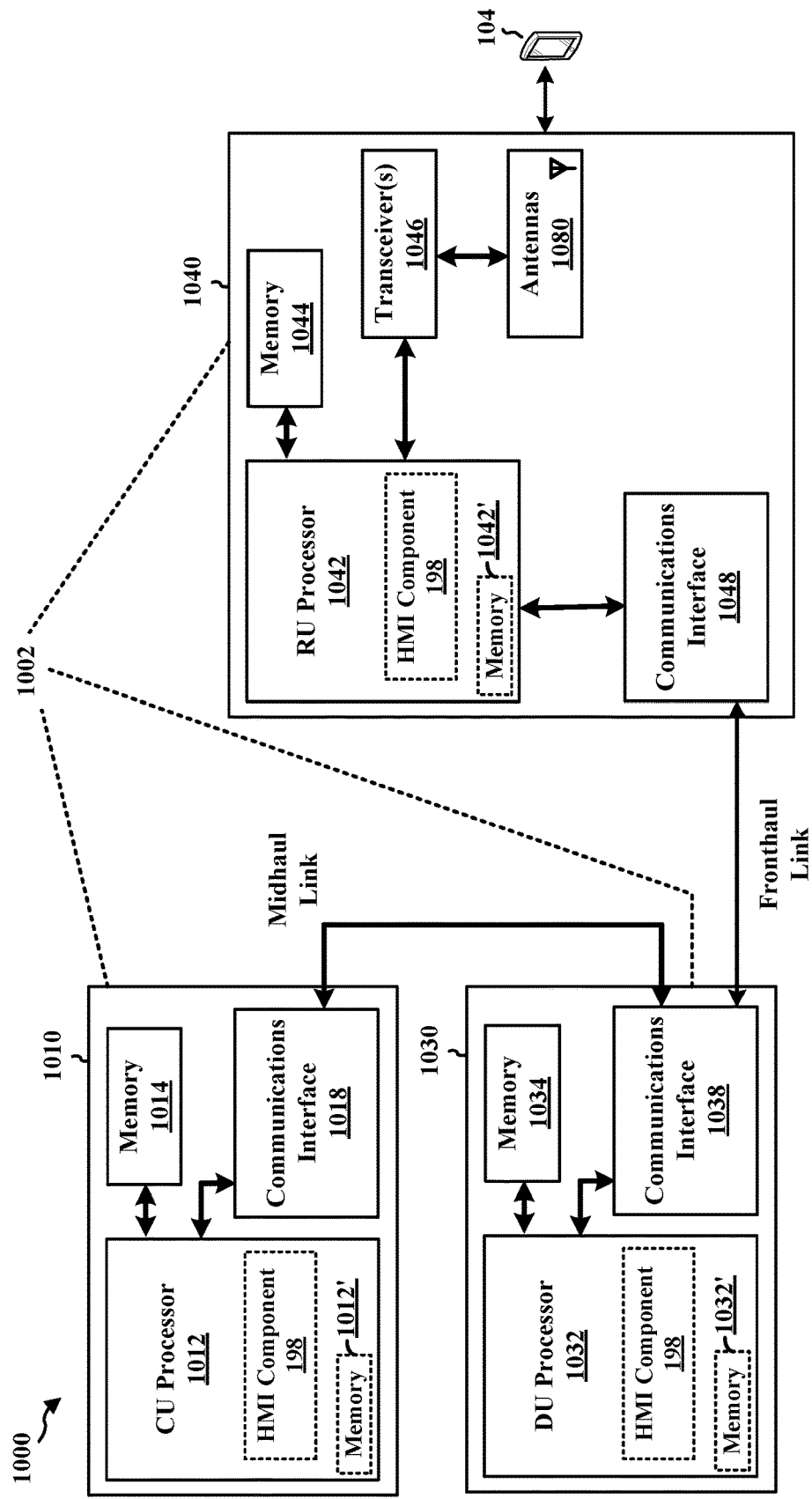
FIG. 10 is a diagram illustrating an example of a hardware implementation for a network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the HMI component 198, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include a CU processor 1012. The CU processor 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include a DU processor 1032. The DU processor 1032 may include on-chip memory 1032'. In some aspects, the DU 1030 may further include additional memory modules 1034 and a communications interface 1038. The DU 1030 communicates with the RU 1040 through a fronthaul link. The RU 1040 may include an RU processor 1042. The RU processor 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the HMI component 198 is configured to obtain one or more of data or at least one signal associated with at least one first matrix, where the at least one first matrix is at least one square matrix, such that a length of the at least one first matrix is equal to a width of the at least one first matrix; perform a decomposition process on the at least one first matrix to obtain at least one first triangular matrix; normalize, based on the decomposition process, the at least one first triangular matrix to obtain at least one second triangular matrix; estimate at least one of (1) an inverse of the at least one second triangular matrix, or (2) an inverse of the at least one first triangular matrix based on the at least one second triangular matrix; and calculate an inverse of the at least one first matrix based on at least one of (1) the estimated inverse of the at least one second triangular matrix, or (2) the estimated inverse of the at least one first triangular matrix; and transmit at least one transmission based on the inverse of the at least one first matrix. The HMI component 198 may be within one or more processors of one or more of the CU 1010, DU 1030, and the RU 1040. The HMI component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1002 may include a variety of components configured for various functions. In one configuration, the network entity 1002 includes means for obtaining one or more of data or at least one signal associated with at least one first matrix. The network entity 1002 may also include means for performing a decomposition process on the at least one first matrix to obtain at least one first triangular matrix. The network entity 1002 may also include means for normalizing, based on the decomposition process, the at least one first triangular matrix to obtain at least one second triangular matrix. The network entity 1002 may also include means for estimating at least one of: (1) an inverse of the at least one second triangular matrix, or (2) an inverse of the at least one first triangular matrix based on the at least one second triangular matrix. The network entity 1002 may also include means for calculating an inverse of the at least one first matrix based on at least one of: (1) the estimated inverse of the at least one second triangular matrix, or (2) the estimated inverse of the at least one first triangular matrix. The network entity 1002 may also include means for calculating a portion of a series approximating one of the inverse of the at least one second triangular matrix or the inverse of the at least one first triangular matrix. The network entity 1002 may also include means for receiving one of data or at least one signal associated with the at least one first matrix from a second device. The network entity 1002 may also include means for processing one of the data or the at least one signal based on the inverse of the at least one first matrix. The apparatus may include means for performing any of the aspects described in connection with the flowcharts in FIGS. 7-8. The means may be the HMI component 198 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

Calculating inverse matrices for Hermitian matrices involved in wireless communication may consume a large amount of resources in a firmware implementation (e.g., a large amount of computations and/or processor cycles) when the matrix size is large, e.g., 16×16, 24×24, or even higher. The method and apparatus presented above may be used to reduce the resources consumed in computing and/or calculating the matrix inversion for recovering the transmitted signal, reduce a latency associated with processing transmissions associated with massive MIMO, and/or reduce a latency associated with physical layer signal processing. While discussed above in relation to wireless communication, the method and apparatus provided in this disclosure may be applied in additional use cases in which a system computes the inverse of a Hermitian matrix.

For example, a DSP (e.g., a DSP 256 (DSP256)) can execute a number of operations (e.g., 256 CMAC operations) in one cycle with single precision or 64 CMAC operations with double precision. Considering the cost of Cholesky decomposition which is 4/3 $P^3$. For P=16, 4/3 $P^3$ is 5462 CMAC operations which takes 22 DSP256 cycles. Normalizing L costs (1+P)*P/2 CMAC operations for matrix multiplication, for P=16, that is 0.6 cycles. Considering the division of diagonal D which costs 1 cycle, in total it is 1.6 cycles. Next, the complexity of two lower triangular matrix multiplication complexity, e.g., $LL^H$ both with sized P×P elements. For example, for P=16, that is $$\sum_{p=3}^{P} \frac{(p-1)(p-2)}{0} = 560$$

CMAC operations. Accordingly, one 16×16 Hermitian matrix multiplication costs 2.2 DSP cycles with single precision and $L^{-1^H} L^{-1}$ will cost $$\sum_{n=1}^{P}\left(nP - \frac{(n-1)n}{2}\right)$$

CMAC operations, e.g., 1496 CMAC operations corresponding to 5.9 cycles for P=16.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented. The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including obtaining one or more of data or at least one signal associated with at least one first matrix, where the at least one first matrix is at least one square matrix, such that a length of the at least one first matrix is equal to a width of the at least one first matrix; performing a decomposition process on the at least one first matrix to obtain at least one first triangular matrix; normalizing, based on the decomposition process, the at least one first triangular matrix to obtain at least one second triangular matrix; estimating at least one of: (1) an inverse of the at least one second triangular matrix, or (2) an inverse of the at least one first triangular matrix based on the at least one second triangular matrix; calculating an inverse of the at least one first matrix based on at least one of: (1) the estimated inverse of the at least one second triangular matrix, or (2) the estimated inverse of the at least one first triangular matrix; and transmit one or more of the data or the at least one signal based on the calculated inverse of the at least one first matrix.

Aspect 2 is the method of aspect 1, where obtaining one or more of the data or the at least one signal associated with the at least one first matrix includes receiving, from a second device, one or more of the data or the at least one signal associated with the at least one first matrix via the transceiver or the antenna.

Aspect 3 is the method of aspect 2, further including processing one or more of the data or the at least one signal based on the calculated inverse of the at least one first matrix.

Aspect 4 is the method of aspect 3, where processing one or more of the data or the at least one signal includes decoding one or more of the data or the at least one signal.

Aspect 5 is the method of aspect 3, where processing one or more of the data or the at least one signal includes performing a minimum mean square error (MMSE) operation on one or more of the data of the at least one signal.

Aspect 6 is the method of aspect 1, further including configuring, based on the calculated inverse of the at least one first matrix, a pre-coding matrix associated with one or more of the data or the at least one signal, where obtaining or transmitting one or more of the data or the at least one signal includes obtaining or transmitting one or more of the data or the at least one signal via one or more antennas based on the pre-coding matrix.

Aspect 7 is the method of aspect 6, where the pre-coding matrix is a zero-forcing pre-coding matrix, where transmitting one or more of the data or the at least one signal includes transmitting one or more of the data or the at least one signal via the one or more antennas based on the zero-forcing pre-coding matrix for a downlink beamforming operation.

Aspect 8, is the method of aspect 6, where obtaining one or more of the data or the at least one signal includes receiving one or more of the data or the at least one signal via the one or more antennas based on the pre-coding matrix for an uplink beamforming operation.

Aspect 9 is the method of any of aspects 1 to 8, where the at least one first matrix is at least one positive-definite Hermitian matrix that is equal to a conjugate transpose of the at least one first matrix.

Aspect 10 is the method of any of aspects 1 to 9, where the decomposition process is one of a Cholesky decomposition, a Cholesky factorization, a first decomposition process that decomposes the at least one first matrix into a first lower triangular matrix pre-multiplying a first upper triangular matrix, a second decomposition process that decomposes the at least one first matrix into a second upper triangular matrix pre-multiplying a second lower triangular matrix, a matrix decomposition, a matrix factorization, or a second third decomposition process that decomposes the at least one first matrix into an orthogonal matrix and a third triangular matrix, where the at least one first triangular matrix is one of the first lower triangular matrix, the second upper triangular matrix, or the third triangular matrix.

Aspect 11 is the method of any of aspects 1 to 10, where normalizing the at least one first triangular matrix includes pre-multiplying the at least one first triangular matrix by an inverse of at least one diagonal matrix associated with the at least one first triangular matrix.

Aspect 12 is the method of aspect 11, where the at least one diagonal matrix is a diagonal matrix including its diagonal elements equal to the at least one first triangular matrix.

Aspect 13 is the method of any of aspects 1 to 12, where estimating the inverse of the at least one second triangular matrix or the inverse of the at least one first triangular matrix includes calculating a portion of a series approximating one of the inverse of the at least one second triangular matrix or the inverse of the at least one first triangular matrix.

Aspect 14 is the method of aspect 13, where the series includes a number of terms that is less than an order of the at least one second triangular matrix or the at least one first triangular matrix.

Aspect 15 is the method of aspect 13, where the portion of the series comprises one of a fixed number of terms in the series or a first number of terms based on a threshold magnitude, and where a last term in the portion of the series is a term in the series having a magnitude below the threshold magnitude.

Aspect 16 is the method of any of aspects 1 to 15, where the inverse of the at least one first matrix is an approximation of an exact inverse of the at least one first matrix calculated based on at least one of: (1) the estimated inverse of the at least one second triangular matrix, or (2) the estimated inverse of the at least one first triangular matrix.

Aspect 17 is an apparatus for wireless communication at a device including a memory and at least one processor coupled to the memory and, based at least in part on information stored in the memory, the at least one processor is configured to implement any of aspects 1 to 16.

Aspect 18 is the apparatus of aspect 17, further including a transceiver or an antenna coupled to the at least one processor.

Aspect 19 is an apparatus for wireless communication at a device including means for implementing any of aspects 1 to 16.

Aspect 20 is a computer-readable medium (e.g., a non-transitory computer-readable medium) storing computer executable code, where the code when executed by a processor causes the processor to implement any of aspects 1 to 16.

What is claimed is:

1. An apparatus for wireless communication at a first device, comprising:
   a memory; and
   at least one processor coupled to the memory and, based at least in part on information stored in the memory, the at least one processor is configured to:
   obtain one or more of data or at least one signal associated with at least one first matrix, wherein the at least one first matrix is at least one square matrix, such that a length of the at least one first matrix is equal to a width of the at least one first matrix;
   perform a decomposition process on the at least one first matrix to obtain at least one first triangular matrix;
   normalize, based on the decomposition process, the at least one first triangular matrix to obtain at least one second triangular matrix;
   estimate at least one of: (1) an inverse of the at least one second triangular matrix, or (2) an inverse of the at least one first triangular matrix based on the at least one second triangular matrix;
   calculate an inverse of the at least one first matrix based on at least one of: (1) the estimated inverse of the at least one second triangular matrix, or (2) the estimated inverse of the at least one first triangular matrix; and
   transmit the one or more of the data or the at least one signal based on the calculated inverse of the at least one first matrix.

2. The apparatus of claim 1, further comprising a transceiver or an antenna coupled to the at least one processor, wherein to obtain the one or more of the data or the at least one signal associated with the at least one first matrix, the at least one processor is configured to:

receive, from a second device, the one or more of the data or the at least one signal associated with the at least one first matrix via the transceiver or the antenna.

3. The apparatus of claim 2, wherein the at least one processor is further configured to:
process the one or more of the data or the at least one signal based on the calculated inverse of the at least one first matrix.

4. The apparatus of claim 3, wherein to process the one or more of the data or the at least one signal, the at least one processor is configured to decode the one or more of the data or the at least one signal.

5. The apparatus of claim 3, wherein to process the one or more of the data or the at least one signal, the at least one processor is configured to perform a minimum mean square error (MMSE) operation on the one or more of the data of the at least one signal.

6. The apparatus of claim 1, further comprising one or more antennas coupled to the at least one processor, wherein the at least one processor is further configured to:
configure, based on the calculated inverse of the at least one first matrix, a pre-coding matrix associated with the one or more of the data or the at least one signal, wherein to obtain or transmit the one or more of the data or the at least one signal, the at least one processor is configured to obtain or transmit the one or more of the data or the at least one signal via the one or more antennas based on the pre-coding matrix.

7. The apparatus of claim 6, wherein the pre-coding matrix is a zero-forcing pre-coding matrix, wherein to transmit the one or more of the data or the at least one signal, the at least one processor is configured to transmit the one or more of the data or the at least one signal via the one or more antennas based on the zero-forcing pre-coding matrix for a downlink beamforming operation.

8. The apparatus of claim 6, wherein to obtain the one or more of the data or the at least one signal, the at least one processor is configured to receive the one or more of the data or the at least one signal via the one or more antennas based on the pre-coding matrix for an uplink beamforming operation.

9. The apparatus of claim 1, wherein the at least one first matrix is at least one positive-definite Hermitian matrix that is equal to a conjugate transpose of the at least one first matrix.

10. The apparatus of claim 1, wherein the decomposition process is one of a Cholesky decomposition, a Cholesky factorization, a first decomposition process that decomposes the at least one first matrix into a first lower triangular matrix pre-multiplying a first upper triangular matrix, a second decomposition process that decomposes the at least one first matrix into a second upper triangular matrix pre-multiplying a second lower triangular matrix, a matrix decomposition, a matrix factorization, or a third decomposition process that decomposes the at least one first matrix into an orthogonal matrix and a third triangular matrix, wherein the at least one first triangular matrix is one of the first lower triangular matrix, the second upper triangular matrix, or the third triangular matrix.

11. The apparatus of claim 1, wherein to normalize the at least one first triangular matrix, the at least one processor is configured to pre-multiply the at least one first triangular matrix by an inverse of at least one diagonal matrix associated with the at least one first triangular matrix.

12. The apparatus of claim 11, wherein the at least one diagonal matrix is a diagonal matrix including its diagonal elements equal to the at least one first triangular matrix.

13. The apparatus of claim 1, wherein to estimate the inverse of the at least one second triangular matrix or the inverse of the at least one first triangular matrix, the at least one processor is configured to:
calculate a portion of a series approximating one of the inverse of the at least one second triangular matrix or the inverse of the at least one first triangular matrix.

14. The apparatus of claim 13, wherein the series includes a number of terms that is less than an order of the at least one second triangular matrix or the at least one first triangular matrix.

15. The apparatus of claim 14, wherein the portion of the series comprises one of a fixed number of terms in the series or a first number of terms based on a threshold magnitude, and wherein a last term in the portion of the series is a term in the series having a magnitude below the threshold magnitude.

16. The apparatus of claim 1, wherein the inverse of the at least one first matrix is an approximation of an exact inverse of the at least one first matrix calculated based on at least one of: (1) the estimated inverse of the at least one second triangular matrix, or (2) the estimated inverse of the at least one first triangular matrix.

17. A method of wireless communication at a first device, comprising:
obtaining one or more of data or at least one signal associated with at least one first matrix, wherein the at least one first matrix is at least one square matrix, such that a length of the at least one first matrix is equal to a width of the at least one first matrix;
performing a decomposition process on the at least one first matrix to obtain at least one first triangular matrix;
normalizing, based on the decomposition process, the at least one first triangular matrix to obtain at least one second triangular matrix;
estimating at least one of: (1) an inverse of the at least one second triangular matrix, or (2) an inverse of the at least one first triangular matrix based on the at least one second triangular matrix;
calculating an inverse of the at least one first matrix based on at least one of: (1) the estimated inverse of the at least one second triangular matrix, or (2) the estimated inverse of the at least one first triangular matrix; and
transmitting the one or more of the data or the at least one signal based on the calculated inverse of the at least one first matrix.

18. The method of claim 17, wherein obtaining the one or more of the data or the at least one signal associated with the at least one first matrix comprises:
receiving, from a second device, the one or more of the data or the at least one signal associated with the at least one first matrix.

19. The method of claim 18, further comprising:
processing the one or more of the data or the at least one signal based on the calculated inverse of the at least one first matrix.

20. The method of claim 19, wherein processing the one or more of the data or the at least one signal comprises decoding the one or more of the data or the at least one signal.

21. The method of claim 17, further comprising:
configuring, based on the calculated inverse of the at least one first matrix, a pre-coding matrix associated with the one or more of the data or the at least one signal, wherein obtaining or transmitting the one or more of the data or the at least one signal comprises: obtaining or transmitting the one or more of the data or the at least one signal based on the pre-coding matrix.

22. The method of claim 17, wherein the at least one first matrix is at least one positive-definite Hermitian matrix that is equal to a conjugate transpose of the at least one first matrix.

23. The method of claim 17, wherein the decomposition process is one of a Cholesky decomposition, a Cholesky factorization, a first decomposition process that decomposes the at least one first matrix into a first lower triangular matrix pre-multiplying a first upper triangular matrix, a second decomposition process that decomposes the at least one first matrix into a second upper triangular matrix pre-multiplying a second lower triangular matrix, a matrix decomposition, a matrix factorization, or a third decomposition process that decomposes the at least one first matrix into an orthogonal matrix and a third triangular matrix, wherein the at least one first triangular matrix is one of the first lower triangular matrix, the second upper triangular matrix, or the third triangular matrix.

24. The method of claim 17, wherein normalizing the at least one first triangular matrix comprises pre-multiplying the at least one first triangular matrix by an inverse of at least one diagonal matrix associated with the at least one first triangular matrix, wherein the at least one diagonal matrix is a diagonal matrix including its diagonal elements equal to the at least one first triangular matrix.

25. The method of claim 17, wherein estimating the inverse of the at least one second triangular matrix or the inverse of the at least one first triangular matrix comprises:
    calculating a portion of a series approximating one of the inverse of the at least one second triangular matrix or the inverse of the at least one first triangular matrix.

26. The method of claim 25, wherein the series includes a number of terms that is less than an order of the at least one second triangular matrix or the at least one first triangular matrix.

27. The method of claim 26, wherein the portion of the series comprises one of a fixed number of terms in the series or a first number of terms based on a threshold magnitude, and wherein a last term in the portion of the series is a term in the series having a magnitude below the threshold magnitude.

28. The method of claim 17, wherein the inverse of the at least one first matrix is an approximation of an exact inverse of the at least one first matrix calculated based on at least one of: (1) the estimated inverse of the at least one second triangular matrix, or (2) the estimated inverse of the at least one first triangular matrix.

29. An apparatus for wireless communication at a first device, comprising:
    means for obtaining one or more of data or at least one signal associated with at least one first matrix, wherein the at least one first matrix is at least one square matrix, such that a length of the at least one first matrix is equal to a width of the at least one first matrix;
    means for performing a decomposition process on the at least one first matrix to obtain at least one first triangular matrix;
    means for normalizing, based on the decomposition process, the at least one first triangular matrix to obtain at least one second triangular matrix;
    means for estimating at least one of: (1) an inverse of the at least one second triangular matrix, or (2) an inverse of the at least one first triangular matrix based on the at least one second triangular matrix;
    means for calculating an inverse of the at least one first matrix based on at least one of: (1) the estimated inverse of the at least one second triangular matrix, or (2) the estimated inverse of the at least one first triangular matrix; and
    means for transmitting the one or more of the data or the at least one signal based on the calculated inverse of the at least one first matrix.

30. A non-transitory computer-readable medium storing computer executable code at a first device, the computer executable code, when executed by a processor, causes the processor to:
    obtain one or more of data or at least one signal associated with at least one first matrix, wherein the at least one first matrix is at least one square matrix, such that a length of the at least one first matrix is equal to a width of the at least one first matrix;
    perform a decomposition process on the at least one first matrix to obtain at least one first triangular matrix;
    normalize, based on the decomposition process, the at least one first triangular matrix to obtain at least one second triangular matrix;
    estimate at least one of: (1) an inverse of the at least one second triangular matrix, or (2) an inverse of the at least one first triangular matrix based on the at least one second triangular matrix;
    calculate an inverse of the at least one first matrix based on at least one of: (1) the estimated inverse of the at least one second triangular matrix, or (2) the estimated inverse of the at least one first triangular matrix; and
    transmit the one or more of the data or the at least one signal based on the calculated inverse of the at least one first matrix.

* * * * *